(12) United States Patent
Yabe

(10) Patent No.: US 10,997,780 B2
(45) Date of Patent: May 4, 2021

(54) IMAGE PROCESSING APPARATUS, IMAGE PROCESSING METHOD, AND STORAGE MEDIUM TO SWITCH BETWEEN THICKENING AND THINNING A LINE DRAWN DIAGONALLY

(71) Applicant: CANON KABUSHIKI KAISHA, Tokyo (JP)

(72) Inventor: Takashi Yabe, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/711,249

(22) Filed: Dec. 11, 2019

(65) Prior Publication Data
US 2020/0211270 A1 Jul. 2, 2020

(30) Foreign Application Priority Data
Dec. 26, 2018 (JP) .............................. JP2018-242853

(51) Int. Cl.
G06T 15/20 (2011.01)
H04N 1/00 (2006.01)
G06T 1/20 (2006.01)
(52) U.S. Cl.
CPC ....... *G06T 15/205* (2013.01); *H04N 1/00015* (2013.01); *G06T 1/20* (2013.01)
(58) Field of Classification Search
CPC .......................... H04N 1/00015; G06T 15/205
See application file for complete search history.

(56) References Cited

U.S. PATENT DOCUMENTS 7,295,346 B2 * 11/2007 Loce ...................... H04N 1/409
358/1.9
8,384,964 B2 * 2/2013 Sakaue ................ H04N 1/4092
358/3.27

(Continued)

FOREIGN PATENT DOCUMENTS

| JP | 7-334672 A | 12/1995 |
| JP | 07334672 A * | 12/1995 |
| JP | 2012-234454 A | 11/2012 |

OTHER PUBLICATIONS

"Emulation of setstrokeadjust Operator", Adobe PostScript, Adobe Developer Support, Mar. 1992, Technical Note #5111, pp. 5-28 (Year: 1992).*

*Primary Examiner* — Terrell M Robinson
(74) *Attorney, Agent, or Firm* — Canon U.S.A., Inc. IP Division

(57) ABSTRACT

An image processing apparatus includes a rendering unit, a reception unit, and a smoothing unit. The rendering unit executes rendering processing on page description language (PDL) data and generate bitmap data. The reception unit receives a setting of a rendering condition that is used in the rendering processing in order for the rendering unit to generate bitmap data in which a diagonal line, having a predetermined line width designated by the PDL data, is thicker than a horizontal line having the predetermined line width. The smoothing unit executes smoothing processing on the generated bitmap data. The smoothing unit executes smoothing processing of thickening the diagonal line within the bitmap data based on reception of the setting of the rendering condition by the reception unit, and the smoothing unit executes smoothing processing of thinning the diagonal line based on non-reception of the setting of the rendering condition by the reception unit.

19 Claims, 20 Drawing Sheets

(56) References Cited

U.S. PATENT DOCUMENTS

| | | | |
|---|---|---|---|
| 2007/0002348 A1* | 1/2007 | Hagiwara | G06F 3/1248 358/1.13 |
| 2012/0287451 A1* | 11/2012 | Takeishi | G06K 15/1888 358/1.13 |
| 2013/0128290 A1* | 5/2013 | Tamura | G06K 15/18 358/1.9 |
| 2016/0266512 A1* | 9/2016 | Haruta | G03G 15/043 |

* cited by examiner

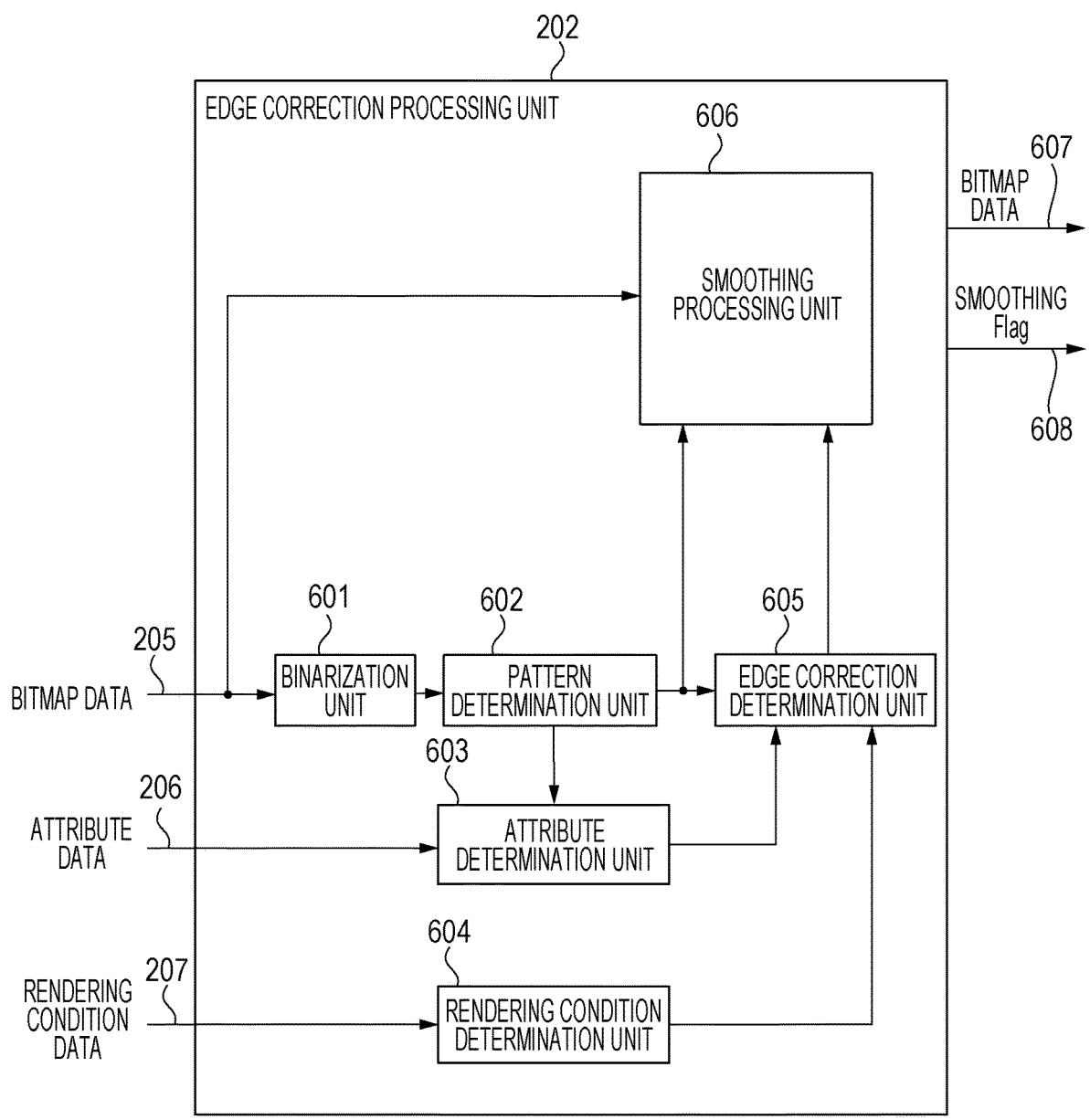

FIG. 10A

|   | a | b | c | d | e |
|---|---|---|---|---|---|
| 1 | 2 | 2 | 2 | 2 | 2 |
| 2 | 2 | 0 | 0 | 0 | 2 |
| 3 | 2 | 0 | 0 | 1 | 2 |
| 4 | 2 | 0 | 1 | 1 | 2 |
| 5 | 2 | 2 | 2 | 2 | 2 |

FIG. 10B

|   | a | b | c | d | e |
|---|---|---|---|---|---|
| 1 | 2 | 2 | 2 | 2 | 2 |
| 2 | 2 | 0 | 0 | 0 | 2 |
| 3 | 2 | 1 | 0 | 0 | 2 |
| 4 | 2 | 1 | 1 | 0 | 2 |
| 5 | 2 | 2 | 2 | 2 | 2 |

FIG. 10C

|   | a | b | c | d | e |
|---|---|---|---|---|---|
| 1 | 2 | 2 | 2 | 2 | 2 |
| 2 | 2 | 1 | 1 | 0 | 2 |
| 3 | 2 | 1 | 0 | 0 | 2 |
| 4 | 2 | 0 | 0 | 0 | 2 |
| 5 | 2 | 2 | 2 | 2 | 2 |

FIG. 10D

|   | a | b | c | d | e |
|---|---|---|---|---|---|
| 1 | 2 | 2 | 2 | 2 | 2 |
| 2 | 2 | 0 | 1 | 1 | 2 |
| 3 | 2 | 0 | 0 | 1 | 2 |
| 4 | 2 | 0 | 0 | 0 | 2 |
| 5 | 2 | 2 | 2 | 2 | 2 |

FIG. 10E

|   | a | b | c | d | e |
|---|---|---|---|---|---|
| 1 | 2 | 2 | 2 | 2 | 2 |
| 2 | 2 | 0 | 0 | 1 | 2 |
| 3 | 2 | 0 | 1 | 1 | 2 |
| 4 | 2 | 1 | 1 | 1 | 2 |
| 5 | 2 | 2 | 2 | 2 | 2 |

FIG. 10F

|   | a | b | c | d | e |
|---|---|---|---|---|---|
| 1 | 2 | 2 | 2 | 2 | 2 |
| 2 | 2 | 1 | 0 | 0 | 2 |
| 3 | 2 | 1 | 1 | 0 | 2 |
| 4 | 2 | 1 | 1 | 1 | 2 |
| 5 | 2 | 2 | 2 | 2 | 2 |

FIG. 10G

|   | a | b | c | d | e |
|---|---|---|---|---|---|
| 1 | 2 | 2 | 2 | 2 | 2 |
| 2 | 2 | 1 | 1 | 1 | 2 |
| 3 | 2 | 1 | 1 | 0 | 2 |
| 4 | 2 | 1 | 0 | 0 | 2 |
| 5 | 2 | 2 | 2 | 2 | 2 |

FIG. 10H

|   | a | b | c | d | e |
|---|---|---|---|---|---|
| 1 | 2 | 2 | 2 | 2 | 2 |
| 2 | 2 | 1 | 1 | 1 | 2 |
| 3 | 2 | 0 | 1 | 1 | 2 |
| 4 | 2 | 0 | 0 | 1 | 2 |
| 5 | 2 | 2 | 2 | 2 | 2 |

FIG. 10I

|   | a | b | c | d | e |
|---|---|---|---|---|---|
| 1 | 2 | 2 | 2 | 2 | 2 |
| 2 | 2 | 0 | 0 | 0 | 2 |
| 3 | 2 | 0 | 0 | 1 | 2 |
| 4 | 2 | 0 | 1 | 0 | 2 |
| 5 | 2 | 2 | 2 | 2 | 2 |

FIG. 10J

|   | a | b | c | d | e |
|---|---|---|---|---|---|
| 1 | 2 | 2 | 2 | 2 | 2 |
| 2 | 2 | 0 | 0 | 0 | 2 |
| 3 | 2 | 1 | 0 | 0 | 2 |
| 4 | 2 | 0 | 1 | 0 | 2 |
| 5 | 2 | 2 | 2 | 2 | 2 |

FIG. 10K

|   | a | b | c | d | e |
|---|---|---|---|---|---|
| 1 | 2 | 2 | 2 | 2 | 2 |
| 2 | 2 | 0 | 1 | 0 | 2 |
| 3 | 2 | 1 | 0 | 0 | 2 |
| 4 | 2 | 0 | 0 | 0 | 2 |
| 5 | 2 | 2 | 2 | 2 | 2 |

FIG. 10L

|   | a | b | c | d | e |
|---|---|---|---|---|---|
| 1 | 2 | 2 | 2 | 2 | 2 |
| 2 | 2 | 0 | 1 | 0 | 2 |
| 3 | 2 | 0 | 0 | 1 | 2 |
| 4 | 2 | 0 | 0 | 0 | 2 |
| 5 | 2 | 2 | 2 | 2 | 2 |

FIG. 10M

|   | a | b | c | d | e |
|---|---|---|---|---|---|
| 1 | 2 | 2 | 2 | 2 | 2 |
| 2 | 2 | 0 | 0 | 1 | 2 |
| 3 | 2 | 0 | 1 | 0 | 2 |
| 4 | 2 | 1 | 0 | 0 | 2 |
| 5 | 2 | 2 | 2 | 2 | 2 |

FIG. 10N

|   | a | b | c | d | e |
|---|---|---|---|---|---|
| 1 | 2 | 2 | 2 | 2 | 2 |
| 2 | 2 | 1 | 0 | 0 | 2 |
| 3 | 2 | 0 | 1 | 0 | 2 |
| 4 | 2 | 0 | 0 | 1 | 2 |
| 5 | 2 | 2 | 2 | 2 | 2 |

| B | B | B | B | B | B | L |
|---|---|---|---|---|---|---|
| B | B | B | B | B | L | L |
| B | B | B | B | L | L | L |
| B | B | B | L | L | L | L |
| B | B | L | L | L | L | B |
| B | L | L | L | L | B | B |
| L | L | L | L | B | B | B |
| L | L | L | B | B | B | B |
| L | L | B | B | B | B | B |
| L | B | B | B | B | B | B |

| 0 | 0 | 0 | 0 | 0 | 0 | 1 |
|---|---|---|---|---|---|---|
| 0 | 0 | 0 | 0 | 0 | 1 | 1 |
| 0 | 0 | 0 | 0 | 1 | 1 | 1 |
| 0 | 0 | 0 | 1 | 1 | 1 | 1 |
| 0 | 0 | 1 | 1 | 1 | 1 | 0 |
| 0 | 1 | 1 | 1 | 1 | 0 | 0 |
| 1 | 1 | 1 | 1 | 0 | 0 | 0 |
| 1 | 1 | 1 | 0 | 0 | 0 | 0 |
| 1 | 1 | 0 | 0 | 0 | 0 | 0 |
| 1 | 0 | 0 | 0 | 0 | 0 | 0 |

FIG. 12A
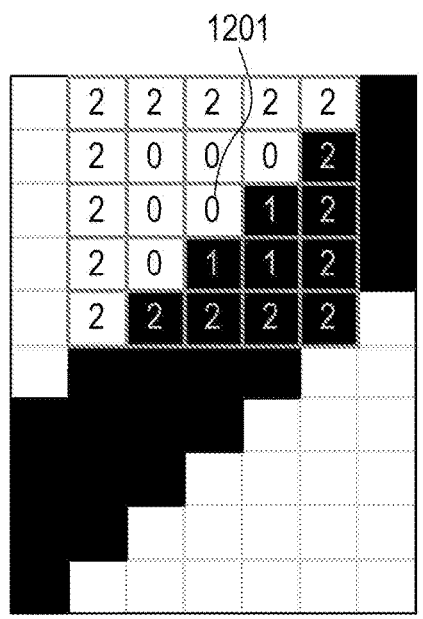
FIG. 12B
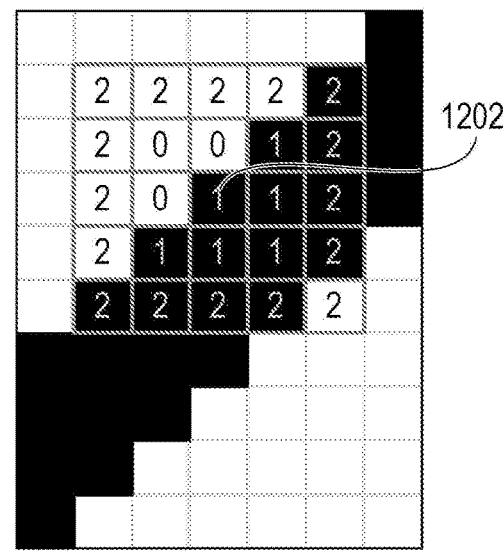
FIG. 12C

| N | N | N | N | N | N | S |
|---|---|---|---|---|---|---|
| N | N | N | N | N | S | N |
| N | N | N | N | S | N | N |
| N | N | N | S | N | N | S |
| N | N | S | N | N | S | N |
| N | S | N | N | S | N | N |
| S | N | N | S | N | N | N |
| N | N | S | N | N | N | N |
| N | S | N | N | N | N | N |
| S | N | N | N | N | N | N |

| B | B | B | B | B | B | G |
|---|---|---|---|---|---|---|
| B | B | B | B | B | G | G |
| B | B | B | B | G | G | G |
| B | B | B | G | G | G | G |
| B | B | G | G | G | G | B |
| B | G | G | G | G | B | B |
| G | G | G | G | B | B | B |
| G | G | G | B | B | B | B |
| G | G | B | B | B | B | B |
| G | B | B | B | B | B | B |

| N | N | N | N | N | S | S |
|---|---|---|---|---|---|---|
| N | N | N | N | S | S | N |
| N | N | N | S | S | N | N |
| N | N | S | S | N | N | S |
| N | S | S | N | N | S | S |
| S | S | N | N | S | S | N |
| S | N | N | S | S | N | N |
| N | N | S | S | N | N | N |
| N | S | S | N | N | N | N |
| S | S | N | N | N | N | N |

| B | B | B | B | B | B | L |
| B | B | B | B | B | L | B |
| B | B | B | B | L | B | B |
| B | B | B | L | B | B | B |
| B | B | L | B | B | B | B |
| B | L | B | B | B | B | B |
| L | B | B | B | B | B | B |

| 0 | 0 | 0 | 0 | 0 | 0 | 1 |
| 0 | 0 | 0 | 0 | 0 | 1 | 0 |
| 0 | 0 | 0 | 0 | 1 | 0 | 0 |
| 0 | 0 | 0 | 1 | 0 | 0 | 0 |
| 0 | 0 | 1 | 0 | 0 | 0 | 0 |
| 0 | 1 | 0 | 0 | 0 | 0 | 0 |
| 1 | 0 | 0 | 0 | 0 | 0 | 0 |

| n  | n  | n  | n  | n  | p0 | p1 |
|----|----|----|----|----|----|----|
| n  | n  | n  | n  | p0 | p1 | p0 |
| n  | n  | n  | p0 | p1 | p0 | n  |
| n  | n  | p0 | p1 | p0 | n  | n  |
| n  | p0 | p1 | p0 | n  | n  | n  |
| p0 | p1 | p0 | n  | n  | n  | n  |
| p1 | p0 | n  | n  | n  | n  | n  |

FIG. 18A
| N | N | N | N | N | S | N |
|---|---|---|---|---|---|---|
| N | N | N | N | S | N | S |
| N | N | N | S | N | S | N |
| N | N | S | N | S | N | N |
| N | S | N | S | N | N | N |
| S | N | S | N | N | N | N |
| N | S | N | N | N | N | N |
FIG. 18B
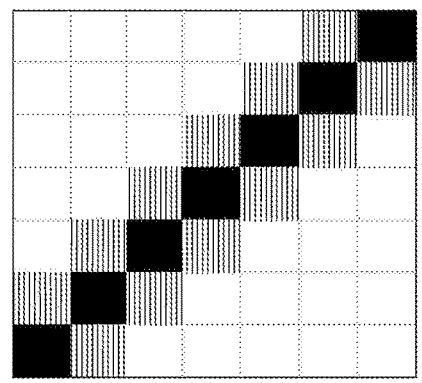
FIG. 19
| B | B | B | B | B | B | G |
|---|---|---|---|---|---|---|
| B | B | B | B | B | G | B |
| B | B | B | B | G | B | B |
| B | B | B | G | B | B | B |
| B | B | G | B | B | B | B |
| B | G | B | B | B | B | B |
| G | B | B | B | B | B | B |
FIG. 20A
| N | N | N | N | N | S | S |
|---|---|---|---|---|---|---|
| N | N | N | N | S | S | S |
| N | N | N | S | S | S | N |
| N | N | S | S | S | N | N |
| N | S | S | S | N | N | N |
| S | S | S | N | N | N | N |
| S | S | N | N | N | N | N |
FIG. 20B
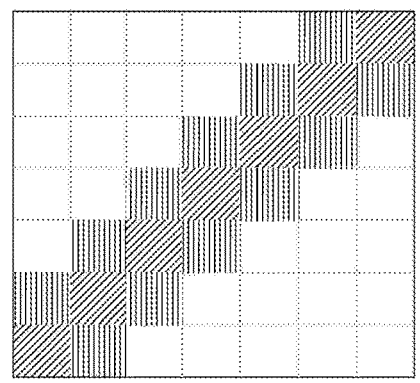

IMAGE PROCESSING APPARATUS, IMAGE PROCESSING METHOD, AND STORAGE MEDIUM TO SWITCH BETWEEN THICKENING AND THINNING A LINE DRAWN DIAGONALLY

BACKGROUND OF THE INVENTION

Field

The present disclosure relates to an image processing apparatus, an image processing method, and a storage medium.

Description of the Related Art

Rendering processing performed when an image processing apparatus executes a print job described in PostScript (hereinafter referred to as PS) uses PS rendering conditions. In a case where a thin line undergoes rendering and then is printed under PS rendering conditions, lines to be drawn might have various thickness depending on whether the coordinates instructed for line drawing are set across pixels, even with a drawing command that designates the same line width.

Japanese Patent Laid-Open No. 2012-234454 discloses a technology that changes a rendering condition using a PS StrokeAdjust (SA) function and that draws a line with the same thickness regardless of the drawing position of designation of a drawing command that designates the same line width.

Japanese Patent Laid-Open No. 7-334672 discloses a technology that performs pattern matching and applies smoothing processing on a pattern at a stepped portion. In addition, whether to make the line thicker or thinner is given in instruction by a user.

Performing rendering processing under the rendering conditions when the SA function is turned off would result in generating a line instructed to draw by the PS drawing command having a higher thickness when drawn diagonally with respect to a sheet compared with the time when the line is drawn perpendicularly/horizontally with respect to the sheet.

In contrast, performing rendering processing under the rendering conditions when the SA function is turned on would result in generating a line instructed to draw by the PS drawing command having a lower thickness when drawn diagonally with respect to a sheet compared with the time when the line is drawn perpendicularly/horizontally with respect to the sheet.

With the use of the method disclosed in Japanese Patent Laid-Open No. 7-334672, it would be possible, after execution of rendering processing, to thicken or thin a line drawn diagonally with respect to the sheet by user's instruction. However, there is a need for the user to give an instruction to thicken the line when the SA function is turned on and give an instruction to thin the line when the SA function is turned off. This necessity to give instructions based on SA function settings would be troublesome. Moreover, for example, giving an instruction by the user to thin the line when the SA function is turned on would result in a failure in obtaining a result intended by the user. The similar applies when the user gives an instruction to thicken the line when the SA function is turned off.

SUMMARY

The present disclosure has been made in view of the above issues, and a purpose of the present disclosure is to provide capabilities, on an image processing apparatus, to switch between thickening and thinning a line drawn diagonally with respect to a sheet on the basis of rendering conditions.

According to an aspect of the present disclosure, an image processing apparatus includes a rendering unit configured to execute rendering processing on page description language (PDL) data and generate bitmap data, a reception unit configured to receive a setting of a rendering condition that is used in the rendering processing in order for the rendering unit to generate bitmap data in which a diagonal line, having a predetermined line width designated by the PDL data, is thicker than a horizontal line having the predetermined line width, and a smoothing unit configured to execute smoothing processing on the bitmap data generated by the rendering unit, wherein the smoothing unit executes smoothing processing of thickening the diagonal line within the bitmap data based on reception of the setting of the rendering condition by the reception unit, and the smoothing unit executes smoothing processing of thinning the diagonal line based on non-reception of the setting of the rendering condition by the reception unit.

Further features of the present disclosure will become apparent from the following description of exemplary embodiments (with reference to the attached drawings).

BRIEF DESCRIPTION OF THE DRAWINGS

FIG. 6 is a diagram illustrating an example of a configuration of an edge correction processing unit.

FIGS. 10A to 10N are views illustrating an example of a pattern used for pattern matching with binarized data.

FIGS. 12A to 12C are views illustrating an example of pattern matching between FIG. 11C and FIGS. 10A to 10N.

FIGS. 17A to 17C are views illustrating an example of pattern matching between FIG. 16C and FIGS. 10A to 10N.

FIGS. 18A and 18B are views illustrating an example of determination results from the smoothing processing unit and bitmap data after the smoothing processing.

FIG. 19 is a view illustrating attribute data when a black portion in FIG. 16A is not a line but has a graphics attribute.

FIGS. 20A and 20B are views illustrating an example of a determination result from the smoothing processing unit and bitmap data after the smoothing processing.

FIG. 24 is a view illustrating bitmap data after density correction processing is performed on bitmap data with line attributes when the SA function is turned on.

DESCRIPTION OF THE EMBODIMENTS

Hereinafter, embodiments for carrying out the present disclosure will be described with reference to the drawings, in addition, the structure illustrated in the following exemplary embodiments is provided merely for illustrative purposes, and the present disclosure is not limited to the configuration illustrated in the figures.

First Exemplary Embodiment

Figure 1:
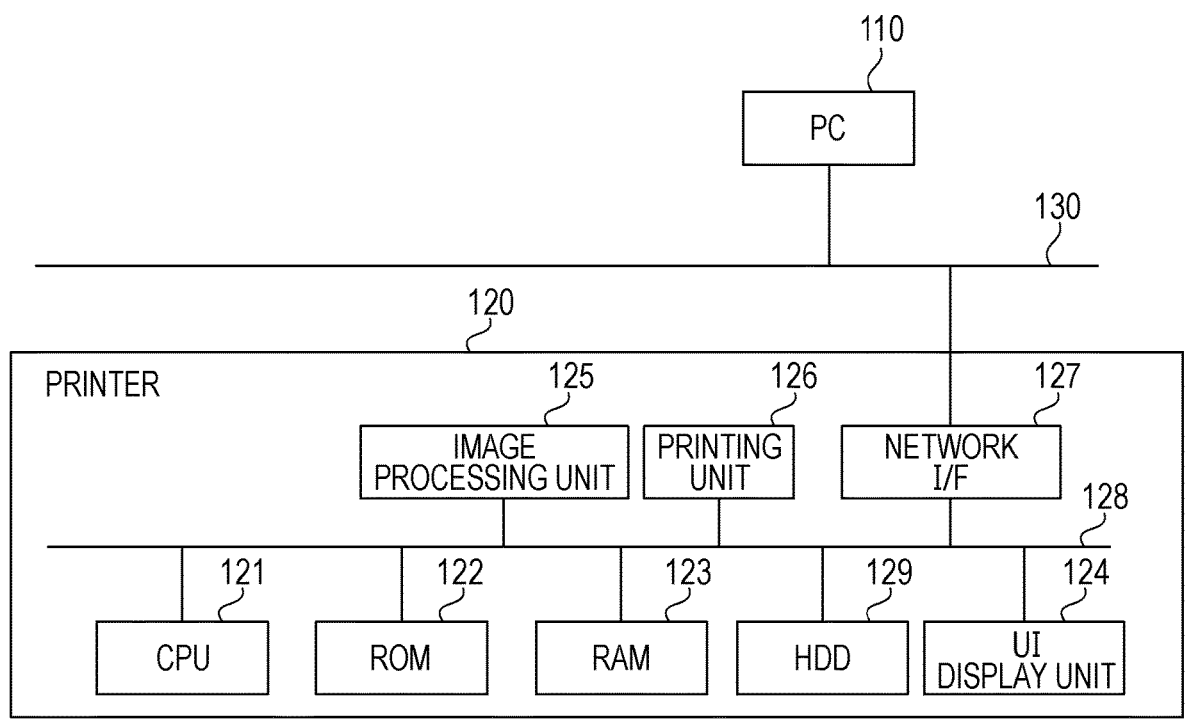
FIG. 1 is a diagram illustrating an example of a configuration of a printing system.

FIG. 1 is a diagram illustrating an example of a configuration of a printing system. The printing system according to the present exemplary embodiment includes a PC 110 as an example of an information processing apparatus, a multi function peripheral (MFP) 120 as an example of an image processing apparatus, and a local area network (LAN) 130. The MFP 120 is connected to the PC 110 via the LAN 130.

After receiving a print instruction from a user via a printer driver of the PC 110, the PC 110 converts application data into PDL data that conforms to the MFP 120, and transmits the converted PDL data to the MFP 120 via the LAN 130. Here, PDL, refers to Page Description Language, which includes a typesetting program having a computer language that describes a printed page appearance. The MFP 120 executes print processing based on the PDL data received via the LAN 130.

The MFP 120 includes a CPU 121, ROM 122, RAM 123, an HDD 129, a user interface (UI) display unit 124, an image processing unit 125, a printing unit 126, a network a 127, and a bus 128.

The CPU 121 integrally controls the MFP 120. Note that the CPU 121 transmits signals to various hardware devices via the bus 128 so as to implement data communication with other hardware devices.

The CPU 121 of the MFP 120 controls the operation of the MIT 120 in accordance with a control program stored in the ROM 122. More specifically, the CPU 121 executes an operating system (OS) that controls the MIT 120 and a driver program for controlling hardware. The application programs arranged on the OS operate in conjunction with each other, so as to achieve functions and control desired by the user. These OS and various programs are stored in the ROM 122 and executed by being read out onto the RAM 123.

The ROM 122 is memory for storing programs and various data used by the CPU 121. The RAM 123 is work memory for temporarily storing programs and data used by the CPU 121 for computing. The RAM 123 is also memory for temporarily storing intermediate data generated in the MFP, a work area that is an operation area for rendering processing, and input image data. The HDD 129 is a storage device that stores various data, various programs, or the like.

The UI display unit 124 is a display unit that displays a screen or the like for operating the MFP 120. The UI display unit 124 may also be a predetermined reception unit such as a touch panel that receives, on the MIT 120, operation or inputs from users.

The image processing unit 125 performs image processing for printing based on bitmap data. Details of the image processing unit will be described with reference to FIG. 2.

The printing unit 126 prints an image on a sheet on the basis of received image data.

The network I/F 127 is a network I/F for performing wired LAN communication such as Ethernet. The network I/F 127 may be a network I/F for performing wireless LAN communication, a USB-LAN I/F, or the like.

The CPU 121 of the MFP 120 of the present exemplary embodiment interprets the received PDL data, executes rendering processing, and generates bitmap data. The rendering processing is performed by execution of software by the CPU 121. However, rendering may be performed by hardware.

In addition, the rendering processing has a plurality of rules. Changing the rules will change the bitmap data to be converted.

Rendering processing is executed to generate bitmap data having a plurality of color components per pixel. The plurality of color components indicates independent color components in a color space such as grayscale or red, green, and blue (RGB). The bitmap data has a value of 8 bits (256 gradations) for one color component for each of pixels. That is, the bitmap data is multi-value image data including multi-value pixels.

The rendering processing further generates attribute data indicating pixel attributes of the image data for each of pixels in addition to the image data. The attribute data indicates an object type to which the pixel belongs. For example, a value indicating the type of object such as a character, line, figure, image, or "no object" that is a non-drawing region is stored as an attribute of the pixel,

[Description of Image Processing Unit]

Figure 2:
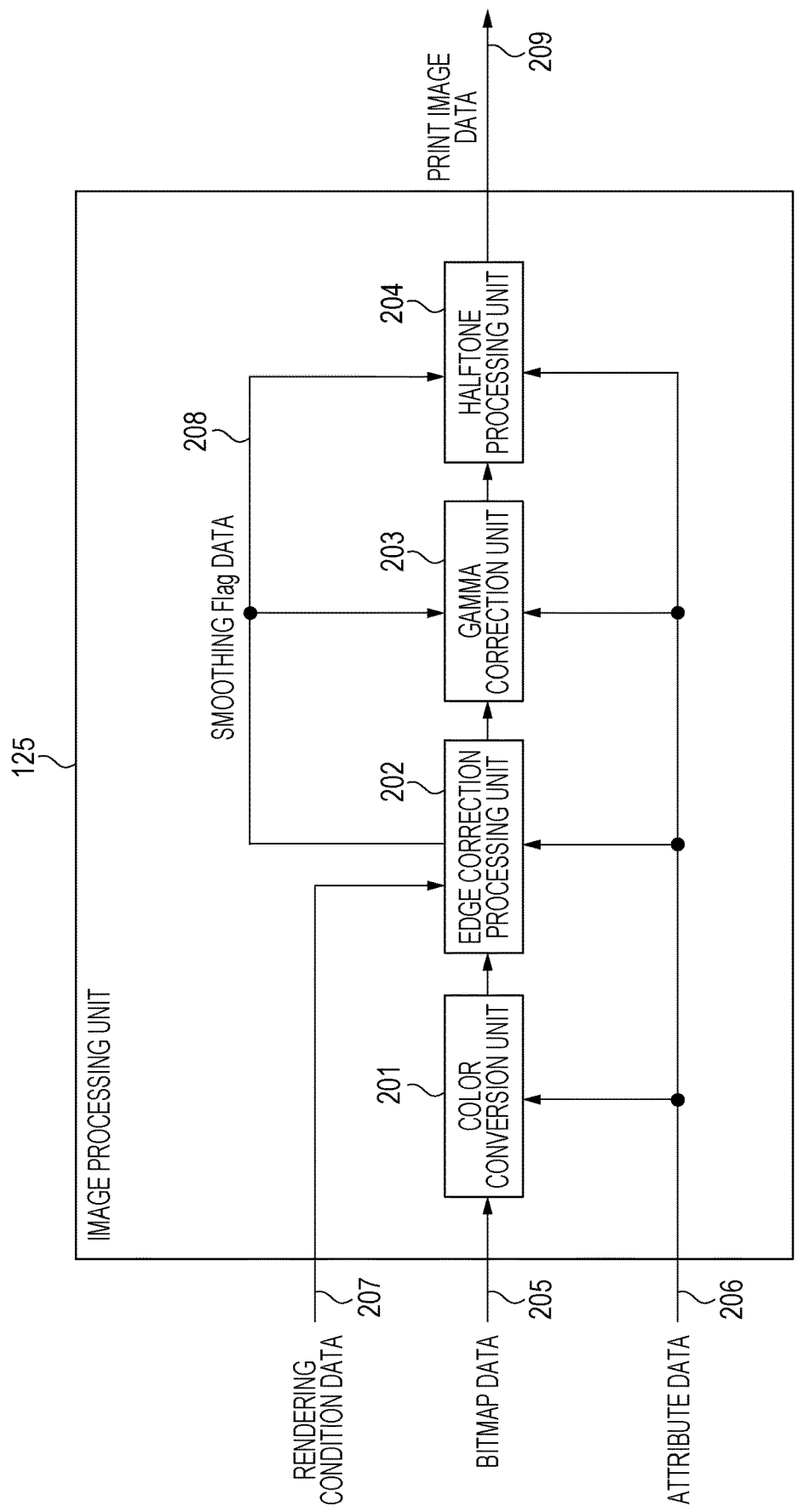
FIG. 2 is a diagram illustrating an example of a configuration of an image processing unit of an MFP.

FIG. 2 is a diagram illustrating an example of a configuration of the image processing unit 125 of the MFP 120. Details of the image processing unit 125 will be described. The image processing unit 125 includes a color conversion unit 201, an edge correction processing unit 202, a gamma correction unit 203, and a halftone processing unit 204. The image processing unit 125 receives inputs of multi-valued bitmap data 205 that has undergone rendering processing and attribute data 206 corresponding to each of pixels of the bitmap data. In addition, rendering condition data 207 indicating the rules used in the rendering processing is also input to the image processing unit 125. The rendering condition is a conversion rule used in converting from logical coordinates to physical coordinates of the MIT 120.

The color conversion unit 201 performs color conversion processing from a grayscale color space or an RGB color space to a cyan, magenta, yellow, and black (CMYK) color space on the bitmap data 205 being multi-valued image data. This color conversion processing generates multi-value bitmap data having multi-value density values (also referred to as gradation values and signal values) of 8 bits (256 gradations) for one color component of one pixel. The bitmap data has CMYK color components and thus is referred to as CMYK image data.

The CMYK image data is stored in a buffer (not illustrated) in the color conversion unit 201. Moreover, in the PDL with the image data having the CMYK color space, such as Post Script (PS) or Portable Document Format (PDF), the color conversion processing in the color conversion unit 201 is not performed, and the CMYK image data is input to the edge correction processing unit 202.

The edge correction processing unit 202 acquires CMYK image data stored in the buffer, executes edge correction processing described below, and outputs the processed image data to the gamma correction unit 203. The edge correction processing unit 202 also outputs smoothing Flag data 208 to the gamma correction unit 203 and the halftone processing unit 204. The smoothing Flag data 208 is data used to switch processing between the gamma correction unit 203 and the halftone processing unit 204, and has various values for each of CMYK colors of the CMYK image data.

The gamma correction unit 203 performs gamma correction processing on the image data input by the edge correction processing unit 202, and then, outputs the image data that has undergone the gamma correction processing to the halftone processing unit 204. The gamma correction processing corrects the input image data using a one-dimensional Look-Up table so as to obtain a desired density characteristic at the transfer of the image data to the recording sheet. The one-dimensional Look-Up table used for correction is stored for each of screen types included in the halftone processing unit 204, and is switched in accordance with the screen type.

The halftone processing unit 204 switches halftone processing in accordance with the smoothing Flag data 208 and the attribute data 206, performs the selected halftone processing on the input image data, and then outputs generated bitmap data (print image data) 209 to the printing unit 126. For example, the pixel that has undergone the smoothing processing has a halftone value. Therefore, when a normal screen is applied without switching the halftone processing, the screen pattern would emerge as jaggies, where non-linear mixing effects producing high-frequency components, or missing or poor anti-aliasing filtering prior to sampling cause artifacts in raster images, such as where different signals become indistinguishable when sampled. To cope with this, using application by switching to a flattening screen in which jaggies are invisible to the pixel that has undergone the smoothing processing would make the jaggies invisible.

Here, performing rendering processing under the rendering conditions when the SA function is turned off would result in generating a line instructed to draw by the PS drawing command having a higher thickness when drawn diagonally with respect to a sheet compared with the time when the line is drawn perpendicularly/horizontally with respect to the sheet.

In contrast, performing rendering processing under the rendering conditions when the SA function is turned on would result in generating a line instructed to draw by the PS drawing command having a lower thickness when drawn diagonally with respect to a sheet compared with the time when the line is drawn perpendicularly/horizontally with respect to the sheet.

With the use of the method disclosed in Japanese Patent Laid-Open No. 7-334672, it would be possible, after execution of rendering processing, to thicken or thin a line drawn diagonally with respect to the sheet by user's instruction. However, there is a need for the user to give an instruction to thicken the line when the SA function is turned on and give an instruction to thin the line when the SA function is turned off. This necessity to give instructions based on SA function settings would be troublesome. Moreover, for example, giving an instruction by the user to thin the line when the SA function is turned on would result in a failure in obtaining a result intended by the user. The similar applies when the user gives an instruction to thicken the line when the SA function is turned off.

Executing the following processing to work towards addressing the above issues would allow the image processing apparatus to switch between thickening and thinning the line drawn diagonally with respect to the sheet based on the rendering conditions.

As another issue, performing rendering processing under the rendering conditions when the SA function of PS is turned on would result in generating a line instructed to draw by the PS drawing command having a lower thickness when drawn diagonally with respect to a sheet compared with the time when the line is drawn perpendicularly/horizontally with respect to the sheet.

Executing the following processing in order to address the above-described issue would allow the image processing apparatus using the SA function of PS to draw a diagonal line with a thickness close to a narrow width designated by a drawing command.

[Description of PDL Data Processing Flow]

Figure 3:
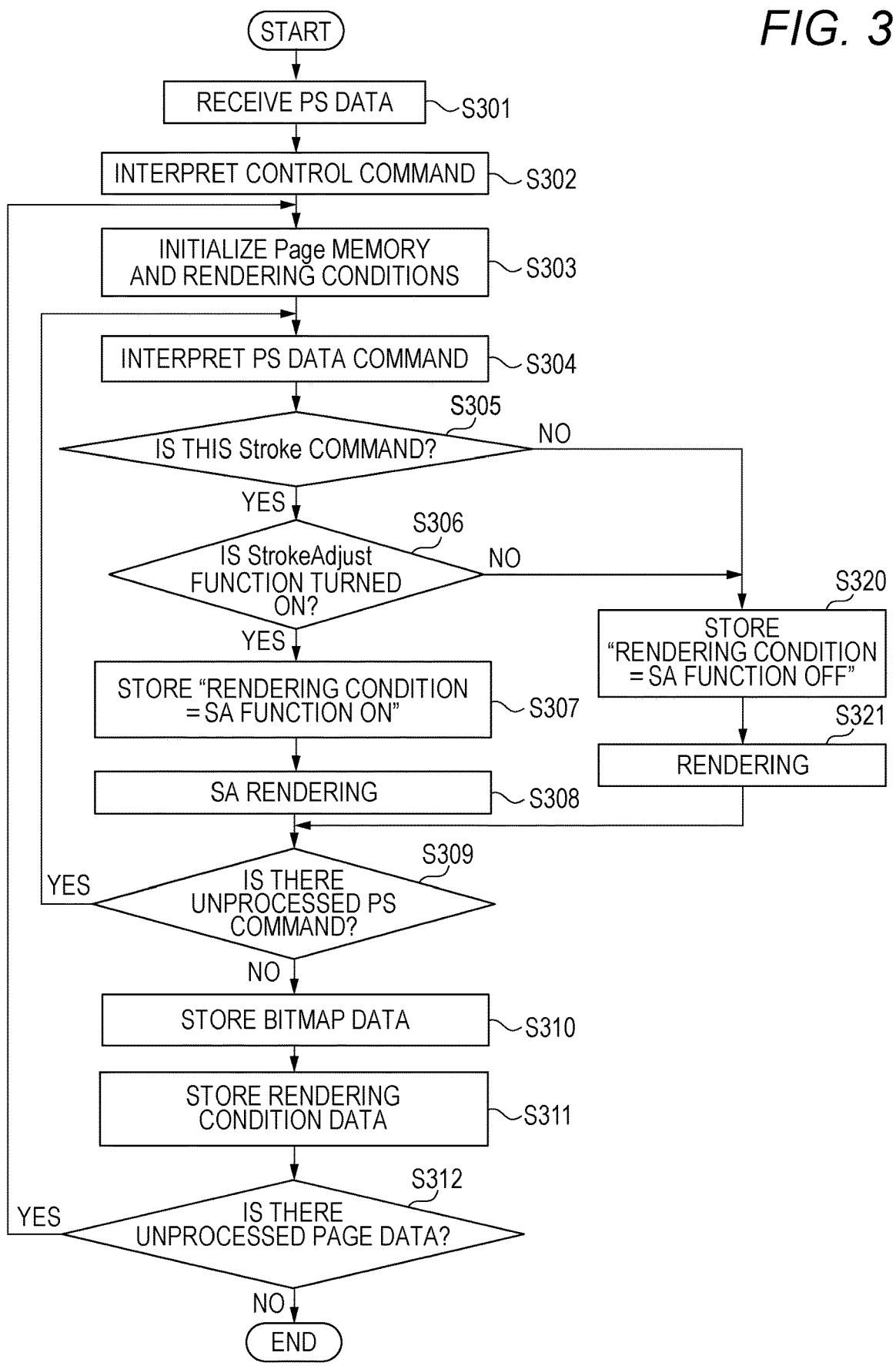
FIG. 3 is a flowchart illustrating an example of processing until generating bitmap data from PDL data.

First, with reference to FIG. 3, a PDL data processing flow till creation of bitmap data to be input to the image processing unit 125 of FIG. 1 from PDL data in the PC 110 and the printer 120 will be described, FIG. 3 is a flowchart illustrating an example of processing until generating bitmap data from PDL data. The CPU 121 reads out the program stored in the ROM 122 to the RAM 123 and executes the program, thereby implementing the processing of the flowchart in FIG. 3. The flow in FIG. 3 is started in response to turn-on of the power supply for the MFP 120. In this flow, an example of receiving PS data will be described as an example of PDL data.

In S301, the CPU 121 receives PS data, which is print data created by an application, a printer driver, or the like, in the PC 110. The PS data represents a print job including one page or a plurality of pages and including a collection of various PS commands for printing.

Figure 4:
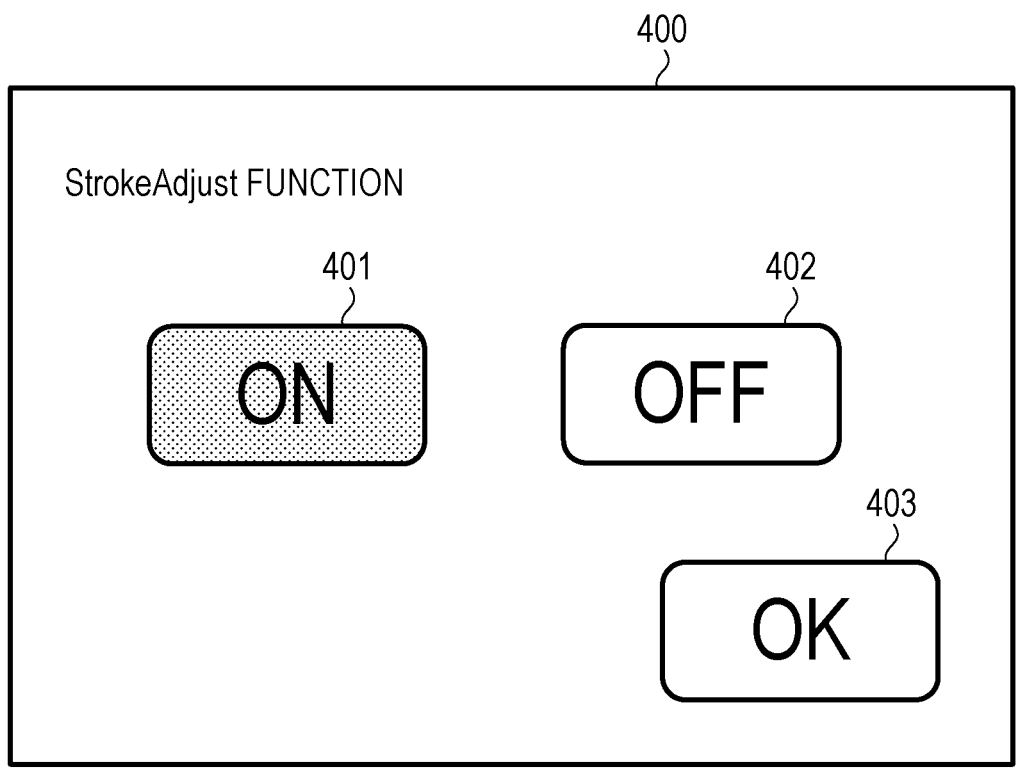
FIG. 4 is a view illustrating an example of a StrokeAdjust function setting screen.

In S302, the CPU 121 interprets a control command that determines various print conditions, and notifies the control destination of the result. For example, the user interface (UI) as illustrated in FIG. 4 is used to interpret a function setting control command of whether to use the StrokeAdjust (SA) function of PS, and notifies the PS interpreter of the setting of the SA function of PS. Here, the SA function is a function to control parameters for automatic stroke adjustment.

FIG. 4 is a view illustrating an example of a StrokeAdjust function setting screen. A setting screen 400 of FIG. 4 is a screen displayed on the UI display unit 124 of the MFP 120. When the user selects an ON button 401 and then selects an OK button 403, the SA function is set to ON. When the user selects an OFF button 402 and then selects an OK button 403, the SA function is set to OFF.

Next, in S303, the CPU 121 initializes the Page memory that stores the bitmap data and attribute data generated in the rendering processing, and initializes the rendering conditions used in rendering processing. The rendering condition typically indicates a conversion rule applied when converting from logical coordinates indicated by a PDL command of PDL data to physical coordinates (device inherent coordinates) indicated by bitmap data. The rendering condition here indicates the SA function of PS, and the initial value is OFF. Here, the SA function of PS is used as a rendering condition, but the condition is not limited to this. The Page memory is a specially reserved area in the RAM 123.

In S304, the CPU 121 interprets the PS command in the PS data.

In S305, the CPU 121 determines whether the PS command interpreted in S304 is a Stroke command being a command for drawing a line. In a case where it is determined that the PS command is a Stroke command, the processing proceeds to S306. Otherwise, the processing proceeds to S320.

In S306, the CPU 121 determines whether the SA function is turned on. In a case where it is determined that the SA function is turned on, the processing proceeds to S307. Specifically, if it is determined that there is a command "setstrokeadjust true" in the PS data, the processing proceeds to S307. In addition, when "setstrokeadjust true" is set as device setting of the printer, the function is turned on when there is no "setstrokeadjust true" command. In this case, the function would be first turned off when designation is false.

In S307, the CPU 121 stores information indicating that the SA function is turned on in the RAM 123 as a page rendering condition in order to store the execution of the SA rendering. Here, in order to simplify the description, the conditions of the SA function are stored for each of pages, but may be held for each of pixels.

In S308, the CPU 121 performs SA rendering processing and generates bitmap data. The SA rendering processing is to perform rendering processing after adjusting the line position by the Stroke command based on the rule of the StrokeAdjust function. At this time, in addition to image data, attribute data indicating the type of PS data command corresponding to each of pixels of the image data is also generated as bitmap data. Here, the generated bitmap data (image data and attribute data) is stored in the Page memory. Here, since the PS data command type is the Stroke command, the attribute data is a line attribute.

In S320, the CPU 121 stores information indicating that the SA function is turned off in the RAM 123 as a page rendering condition in order to store execution of rendering.

In S321, the CPU 121 performs rendering processing. The processing is performed under the rendering conditions of PS, rather than under the rendering conditions of the SA function. The difference in rendering conditions will be described below. At this time, similarly to S308, attribute data indicating the type of PS data command corresponding to each of pixels of image data, in addition to the image data, is also generated as bitmap data. Here, the generated bitmap data (image data and attribute data) is stored in the Page memory.

For example, when the type of PS data command is a character command, the attribute data will have a character attribute. The attribute data will have a line attribute when the type of PS data command is the Stroke command. The attribute data will have a graphics attribute when the type is a graphic command. The attribute data will have an image attribute when the PS data command type is a bitmap command. In addition, the attribute data of the part having no command at the time of PS data will have a background attribute. These pieces of attribute data are used for switching the processing of the image processing unit 125 described below.

In S309, the CPU 121 determines whether there is an unprocessed PS command. In a case where it is determined that there is an unprocessed PS command, the processing returns to S304 to interpret the next PS data command. Otherwise, the processing proceeds to S310.

In S310, the CPU 121 stores bitmap data (image data and attribute data) for one page stored in the Page memory, in the HDD 129.

In S311, the CPU 121 stores information indicating the rendering condition in the HDD 129 as rendering condition data for each of pages.

In S312, the CPU 121 determines whether there is unprocessed page data. In a case where it is determined that there is unprocessed page data, the processing returns to S303 to continue the processing for the next page. Otherwise, the processing will end,

[Explanation of Differences in Rendering Conditions (Rules)]

Figure 5A:
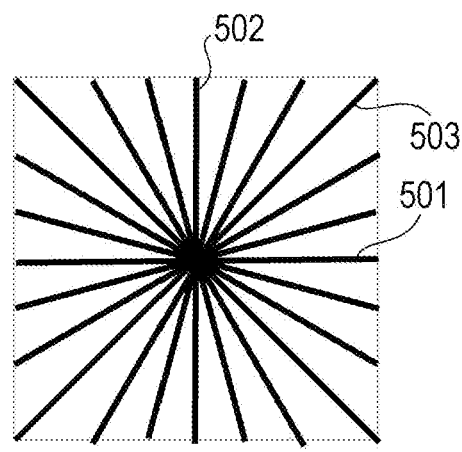
FIGS. 5A to 5C are views illustrating an example of bitmap data generated by rendering processing under various rendering conditions.
Figure 5B:
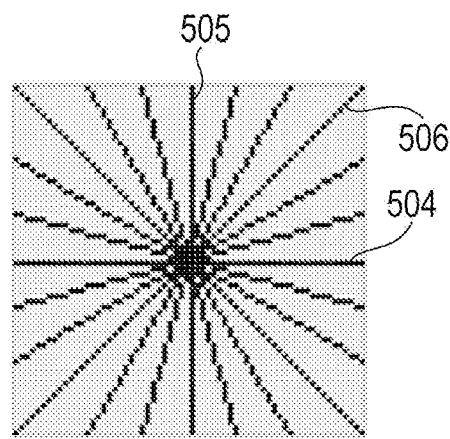
Figure 5C:
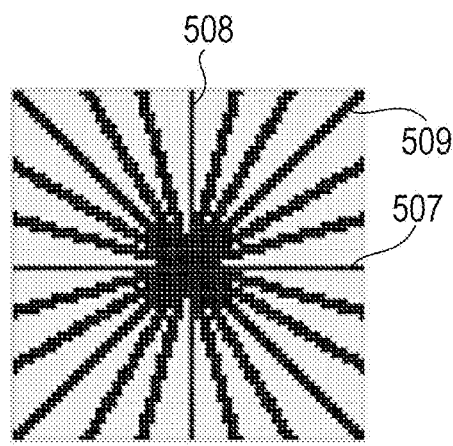

The difference in rendering conditions between S307 and S320 will be described with reference to FIGS. 5A to 5C, FIGS. 5A to 5C are views illustrating an example of bitmap data generated by rendering processing under various rendering conditions.

The conversion of the PS command from the logical coordinates to the physical coordinates (device coordinates) after rendering has a difference depending on whether the StrokeAdjust (SA) function is turned on (true) or off (false), FIG. 5A illustrates an example in which the logical coordinates of the PS data before rendering processing are displayed on the monitor of the PC 110. A horizontal direction line 501, a vertical direction line 502, and a 45-degree line 503 have a same thickness.

FIG. 5B and FIG. 5C illustrate results of conversion from logical coordinates to physical coordinates in bitmaps represented by device inherent pixels according to rendering conditions. Here illustrates an example in which the resolution generally used in printers is 600 dpi.

The result of applying rendering processing on FIG. 5A so as to have device inherent coordinates with a resolution of 600 dpi are illustrated in FIG. 5B and FIG. 5C, in which lines have thicknesses and shapes different from each other. FIG. 5B illustrates a case where the SA function is turned on, and FIG. 5C illustrates a case where the SA function is turned off.

The SA function is an adjustment function to reduce errors when converting the PS Stroke command from logical coordinates to physical coordinates. Note that the SA function is not valid when the PS command is other than a Stroke command.

When FIG. 5B is compared with FIG. 5C, the error is generally smaller in FIG. 5B than in FIG. 5C. However, in FIG. 5B, a 45-degree line 506 is thinner than a horizontal direction line 504 and a vertical direction line 505. When the thickness is analyzed in terms of angles, lines are particularly thin in the diagonal direction of 45 degrees (similarly applied to 135 degrees, 225 degrees, and 315 degrees).

In contrast, in FIG. 5C, a 45-degree line 509 is thicker than a horizontal direction line 507 and a vertical direction line 508. When the thickness is analyzed in terms of angles, lines are particularly thick in the diagonal direction of 45 degrees (similarly applied to 135 degrees, 225 degrees, and 315 degrees). It is observed that, when a command is processed with various angles of a thin line having the same designated line width, the line width of the thin line having the same designated line width varies depending on the angle in accordance with the rendering condition.

[Description of Edge Correction Processing Switching Determination]

Figure 7:
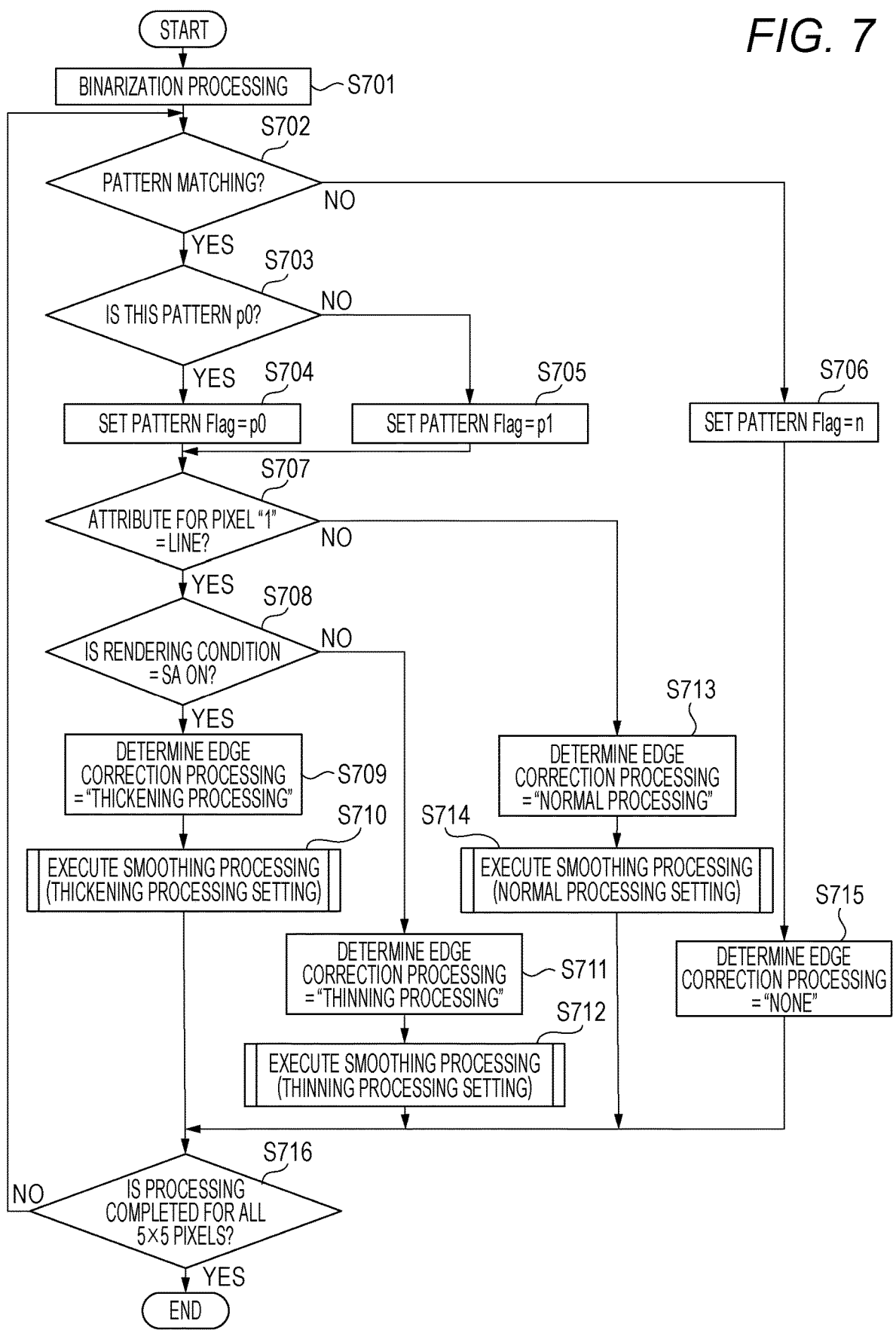
FIG. 7 is a flowchart illustrating an example of edge correction processing switching processing.

The edge correction processing unit 202 will be described in detail with reference to FIGS. 6 and 7. This processing is to determine whether to switch edge correction processing that addresses the issue that the line width of the thin line having the same designated line width varies depending on the angle in accordance with the rendering condition. In the edge correction processing, CMYK is individually input as image data and processed separately. Here, in order to simplify the explanation, description will be given as limited to K, that is, black. Note that similar processing is performed for other colors of CMY.

FIG. 6 is a diagram illustrating an example of a configuration of the edge correction processing unit 202. FIG. 7 is a flowchart illustrating an example of edge correction processing switching processing. The CPU 121 reads out the program stored in the ROM 122 to the RAM 123 and executes the program, thereby implementing the processing of the flowchart in FIG. 7. The flow in FIG. 7 is started in response to generation of the bitmap data in each rendering processing in FIG. 3 and execution of the color conversion processing in the color conversion unit 201.

In S701, the CPU 121 controls a binarization unit 601 so that the binarization unit 601 performs binarization processing on the input bitmap data (image data) 205 to generate binarized data. Binarization is performed such that data is set to 1 when the pixel value is greater than a threshold, or data is set to 0 when the pixel value is equal to or smaller than the threshold.

Figures 11A, 11B, 11C:
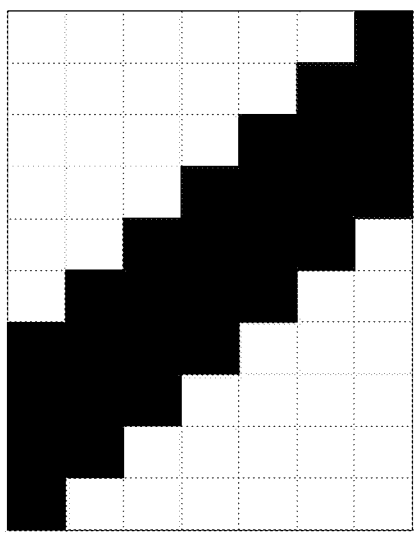
FIGS. 11A to 11C are views illustrating an example of bitmap data and attribute data.

FIGS. 11A and 11B are diagrams illustrating an example of line drawing. FIGS. 11A and 11B are an example of line drawing that has undergone rendering on the MFP 120, and illustrate a part of the 45-degree line 509 of FIG. 5C in which the SA function is turned off. FIG. 11A illustrates bitmap data and FIG. 11B illustrates attribute data, each after rendering. FIG. 11C is an example of a bitmap in which the bitmap data 205 illustrated in FIG. 11A is binarized by the binarization unit 601. In FIG. 11B, "B" represents a background attribute, and "L" represents a line attribute.

In S702, the CPU 121 controls the pattern determination unit 602 so that the pattern determination unit 602 performs pattern matching between the binarized data and a preliminarily set pattern to determine whether the patterns match. FIGS. 10A to 10N are views illustrating an example of patterns for pattern matching with binarized data, being an example of patterns for detecting a 45-degree diagonal line. FIGS. 10A to 10D and FIGS. 10I to 10L illustrate an example of patterns of a pattern p0 in which a pixel of interest is 0. FIGS. 10E to 10H and FIGS. 10M and 10N illustrate an example of patterns of a pattern p1 in which the pixel of interest is 1. The pattern is used in pattern matching since the angle to be corrected is a 45-degree diagonal line. However, adding a pixel pattern having an angle to be corrected would similarly achieve an effect of correcting the angle. That is, the matching pixel pattern differs depending on the angle, and thus, the intensity of the smoothing processing may be varied for each of angles (pixel pattern). For example, the intensity of the smoothing processing may be reduced as the angle becomes closer to 90 degrees, 180 degrees, and 270 degrees.

In the pattern matching, the pixel value is compared one by one between a portion of 25 pixels including 5×5 pixels extracted from the binarized image data and the pattern of FIGS. 10A to 10N. In the present exemplary embodiment, it is determined whether pixels except for pixels having a pattern value "2" match with the portion extracted from the image data. In addition, a pixel having a pattern value "2" is determined to match regardless of the value of the pixel of the binarized image data portion at the corresponding position. In a case where it is determined that the extracted portion matches with the pattern, the processing proceeds to S703. Otherwise, the processing proceeds to S706.

In S703, the CPU 121 determines whether the pixel of interest at the center of the image data determined to match with the pattern of FIGS. 10A to 10N by the pattern determination unit 602 is the pattern p0 having the pixel of interest "0" or the pattern p1 having the pixel of interest "1".

FIGS. 12A to 12C are views illustrating an example of pattern matching between FIG. 11C and FIGS. 10A to 10N. For example, FIG. 12A illustrates a matching example between the bitmap data of FIG. 11A and the pattern of FIG. 10A. FIGS. 11A to 11C are views illustrating an example of bitmap data and attribute data. The black portion in FIG. 12A corresponds to "1" after binarization, and thus, black and "1" match. The white part in FIG. 12A corresponds to "0" after binarization, and thus, white and "0" match. Since the pixel other than the pattern value "2" matches with the pixel of interest and the pixels around the pixel of interest, and a pixel of interest 1201 at the center of the pattern is "0", it is determined as the pattern p0. FIG. 12B illustrates an example of the bitmap data of FIG. 11A and the pattern of FIG. 10E. Since the pixel other than the pattern value "2" matches with the pixel of interest and the pixels around the pixel of interest, and the pixel of interest 1202 at the center of the pattern is "1", it is determined as the pattern p1. In a case where it is determined that the image data determined to match with the pattern of FIGS. 10A to 10N matches with the pattern p0, the processing proceeds to S704. Otherwise, the processing proceeds to S705.

In S704, the CPU 121 sets the pattern Flag to p0. In S705, the CPU 121 sets the pattern Flag to p1. As a result, the binarized data in FIG. 11C is converted to the pattern Flag data in FIG. 12C and then output to the edge correction determination unit 605. In S706, the extracted portion has no match with any pattern, the CPU 121 sets the pattern Flag to n.

Figures 13A, 13B, 14:
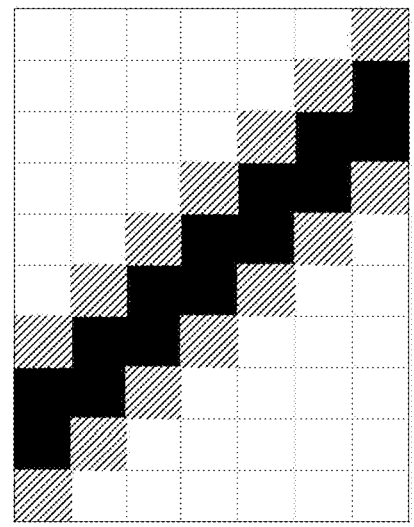
FIGS. 13A and 13B are views illustrating an example of a result determined by an attribute determination unit.
FIG. 14 is a view illustrating attribute data when a black portion in FIG. 11A is not a line but has a graphics attribute.

In S707, the CPU 121 controls the attribute determination unit 603 so that the attribute determination unit 603 determines whether the attribute data of the pixel "1" of the image data determined to match with the pattern by the pattern determination unit 602 is a line. FIGS. 13A and 13B are views illustrating an example of a result determined by the attribute determination unit 603. The attribute data as illustrated in FIG. 11B leads to the result of FIG. 13A, by which it is observed that all the determined pattern portions are lines. In a case where it is determined that the attribute data of the pixel "1" is a line, the processing proceeds to S708. Otherwise, the processing proceeds to S713.

FIG. 13B is a view illustrating an example of a case where FIG. 12A is designated by a graphics command, rather than by the Stroke command.

In S708, the CPU 121 controls the rendering condition determination unit 604 so that the rendering condition determination unit 604 determines whether the rendering condition=SA function ON is affirmative in S708. In a case where it is determined as the SA function ON, the processing proceeds to S709. Otherwise, the processing proceeds to S711.

In S709, the CPU 121 controls the edge correction determination unit 605 so that the edge correction determination unit 605 determines "thickening processing" as the edge correction determination as illustrated in Table 1 below,

TABLE 1

| PATTERN MATCHING | Yes | Yes | Yes | No |
|---|---|---|---|---|
| ATTRIBUTE = LINE | Yes | Yes | No | — |
| RENDERING CONDITION = SA ON | Yes | No | No | — |
| EDGE CORRECTION DETERMINATION | THICKENING PROCESSING | THINNING PROCESSING | NORMAL PROCESSING | NONE |

In S710, the CPU 121 controls a smoothing processing unit 606 so that the smoothing processing unit 606 executes the smoothing processing under a "thickening processing setting". With this smoothing processing of the "thickening processing setting", it is possible to prevent the thinning of the diagonal line, particularly the diagonal 45-degree line, due to the ON setting of the SA function. Details of the smoothing processing using "thickening processing setting" will be described below.

In S711, the CPU 121 controls the edge correction determination unit 605 so that the edge correction determination unit 605 determines "thinning processing" as the edge correction determination as illustrated in Table 1.

In S712, the CPU 121 controls a smoothing processing unit 606 so that the smoothing processing unit 606 executes the smoothing processing under a "thinning processing setting". With this smoothing processing of the "thinning processing setting", it is possible to prevent the thickening of the diagonal line, particularly the diagonal 45-degree line, due to the OFF setting of the SA function. Details of the smoothing processing of "thickening processing setting" will be described below.

In S713, the CPU 121 controls the edge correction determination unit 605 so that the edge correction determination unit 605 determines "normal processing" as the edge correction determination as illustrated in Table 1.

In S714, the CPU 121 controls a smoothing processing unit 606 so that the smoothing processing unit 606 executes the smoothing processing under a "normal processing setting", This "normal processing setting" is processing of setting portions to undergo the thinning and the thickening in the smoothing processing to have the same number of pixels so as to suppress the execution of both thickening and thinning. That is, neither thickening nor thinning will be applied to a portion where neither thickening nor thinning is necessary.

In S715, the CPU 121 controls the edge correction determination unit 605 so that the edge correction determination unit 605 determines "None" as the edge correction determination as illustrated in Table 1.

In S716, the CPU 121 determines whether the processing has been completed for all the 5×5 pixels. In a case where it is determined that the processing is completed, the processing will end. Otherwise, the processing is repeated for unprocessed 5×5 pixels.

[Description of Edge Correction Processing Flow]

The smoothing processing will be described with reference to FIGS. 8A, 8B, and 9. First, Table 2 illustrates smoothing processing corresponding to the edge correction determination result and the pattern Flag. In Table 2, "S" in the row of the smoothing processing indicates that the smoothing processing is "performed", that is, the smoothing processing is to be performed. In contrast, N in the row of smoothing processing indicates that the smoothing processing is "not performed", that is, the smoothing processing is not to be performed.

TABLE 2

| | EDGE CORRECTION DETERMINATION | | | | | | |
|---|---|---|---|---|---|---|---|
| | THICKENING PROCESSING | | THINNING PROCESSING | | NORMAL PROCESSING | | NONE |
| PATTERN Flag | p0 | p1 | p0 | p1 | p0 | p1 | n |
| SMOOTHING PROCESSING | S | N | N | S | S | S | N |

Figure 8A:
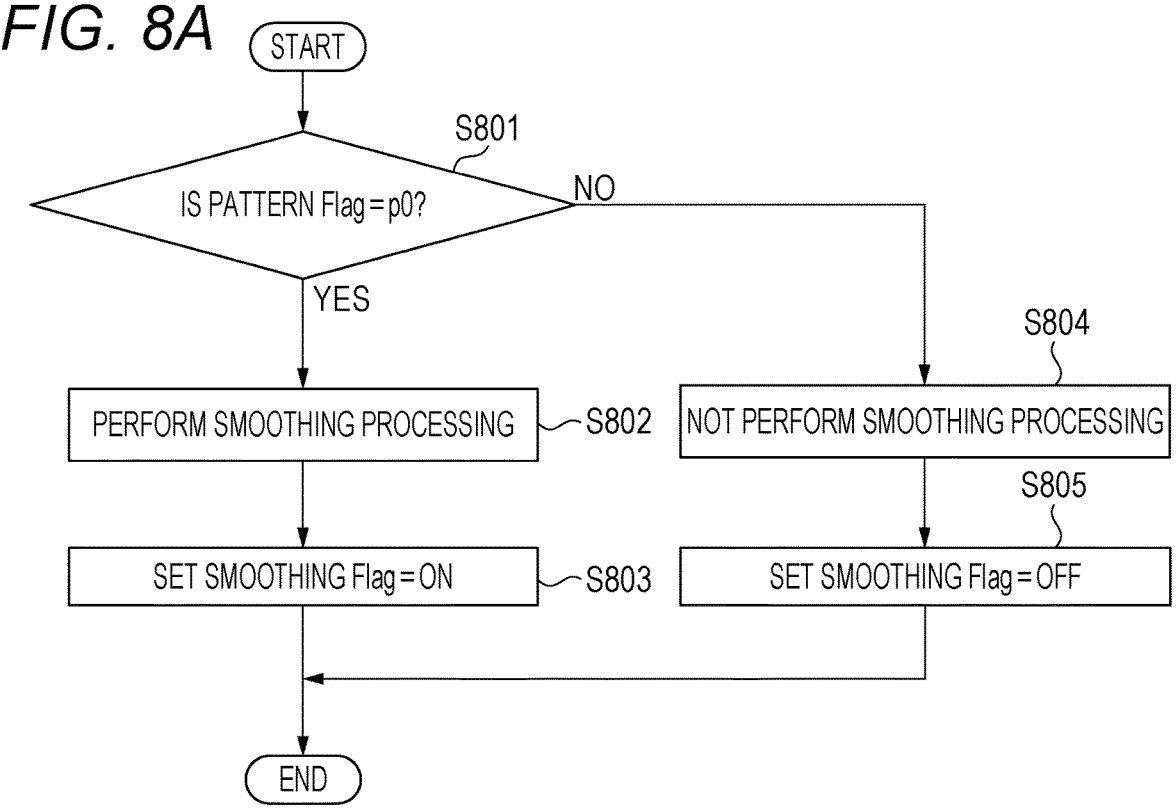
FIGS. 8A and 8B are flowcharts illustrating an example of smoothing processing.
Figure 8B:
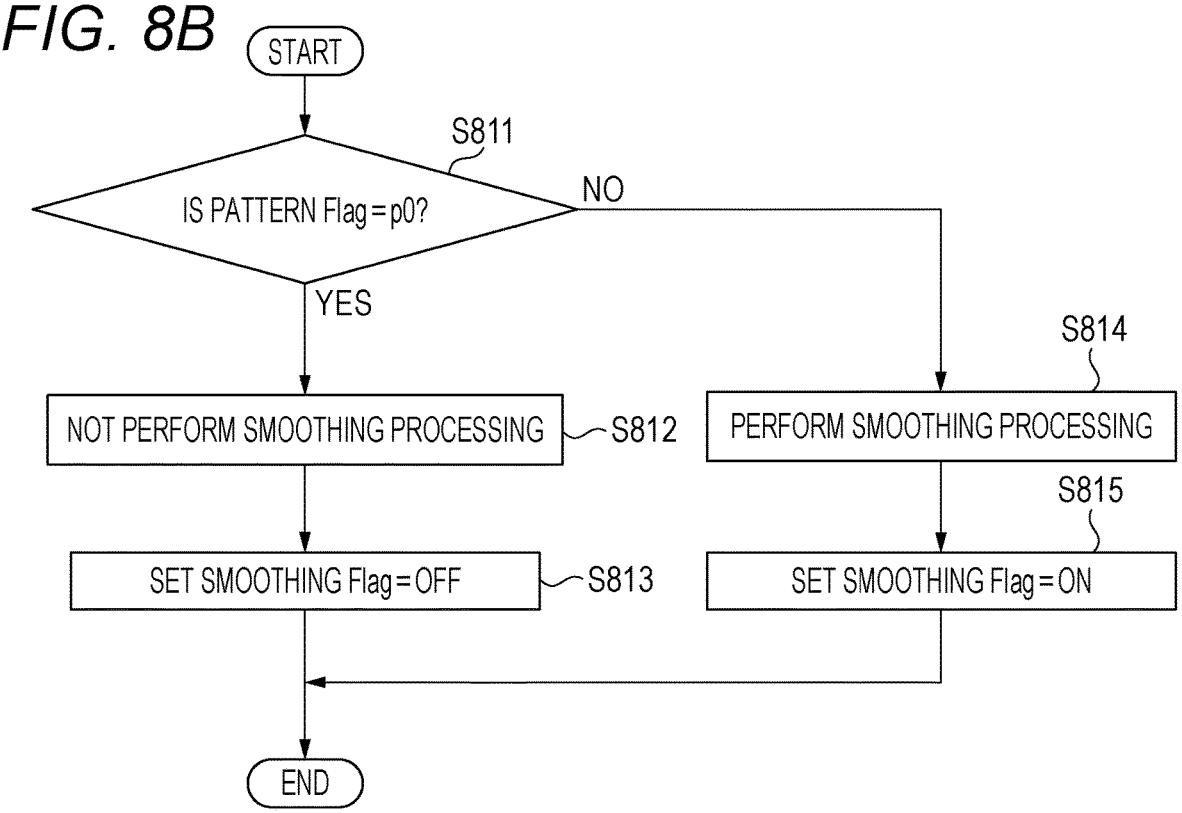

FIGS. 8A and 8B are flowcharts illustrating an example of smoothing processing. FIG. 8A is a flowchart illustrating an example of smoothing processing when the edge correction determination unit 605 determines "thickening processing", The CPU 121 reads out the program stored in the ROM 122 to the RAM 123 and executes the program, thereby implementing the processing of the flowchart in FIG. 8A. The flow in FIG. 8A is started in response to the completion of the processing of S709.

In S801, the CPU 121 determines whether the pattern Flag is p0. In a case where it is determined that the pattern Flag is p0, the processing proceeds to S802. Otherwise, the processing proceeds to S804.

In S802, the CPU 121 controls the smoothing processing unit 606 so that the smoothing processing unit 606 performs the smoothing processing on the bitmap data 205 and outputs the processed bitmap data 607.

In S803, the CPU 121 controls the smoothing processing unit 606 so that the smoothing processing unit 606 turns on a smoothing Flag 608 for each of pixels on which the smoothing processing has been performed.

In S804, the CPU 121 controls the smoothing processing unit 606 so that the smoothing processing unit 606 outputs the pixel value of the input bitmap data as it is as the bitmap data 607 without performing the smoothing processing on the bitmap data.

In S805, the CPU 121 controls the smoothing processing unit 606 so that the smoothing Flag 608 is turned off for a processing target pixel since the smoothing processing unit 606 has not performed the smoothing processing.

When the thickening processing is set, the smoothing processing is performed on a pattern Flag p0 portion alone. For portions other than the pattern Flag p0, input image data will be used as pixel data as it is. In the pattern of the pattern Flag p0, the image data of the pixel of interest portion corresponds to a portion of 0, and the data value is added by the smoothing processing. Accordingly, this corresponds to thickening processing in which added portion becomes thicker.

FIG. 8B is a flowchart illustrating an example of smoothing processing when the edge correction determination unit 605 determines "thinning processing". The CPU 121 reads out the program stored in the ROM 122 to the RAM 123 and executes the program, thereby implementing the processing of the flowchart in FIG. 8B. The flow in FIG. 8B is started in response to the completion of the processing of S711.

In S811, the CPU 121 determines whether the pattern Flag is p0. In a case where it is determined that the pattern Flag is p0, the processing proceeds to S812. Otherwise, the processing proceeds to S814.

In S812, the CPU 121 controls the smoothing processing unit 606 so that the smoothing processing unit 606 outputs the pixel value of the input bitmap data as it is as the bitmap data 607 without performing the smoothing processing on the bitmap data.

In S813, the CPU 121 controls the smoothing processing unit 606 so that the smoothing Flag 608 is turned off for the processing target pixel since the smoothing processing unit 606 has not performed the smoothing processing.

In S814, the CPU 121 controls the smoothing processing unit 606 so that the smoothing processing unit 606 performs the smoothing processing on the bitmap data 205 and outputs the processed bitmap data 607.

In S815, the CPU 121 controls the smoothing processing unit 606 so that the smoothing processing unit 606 turns on the smoothing Flag 608 for each of pixels on which the smoothing processing has been performed.

When the thinning processing is set, the smoothing processing is performed on the portion of the pattern Flag p1 alone. For portions other than the pattern Flag p1, input image data will be used as pixel data as it is. In the pattern of the pattern Flag p1, the image data of the pixel of interest portion corresponds to a portion of 1, and the data value is reduced by the smoothing processing. Accordingly, this corresponds to thinning processing in which added portion is thinned.

Figure 9:
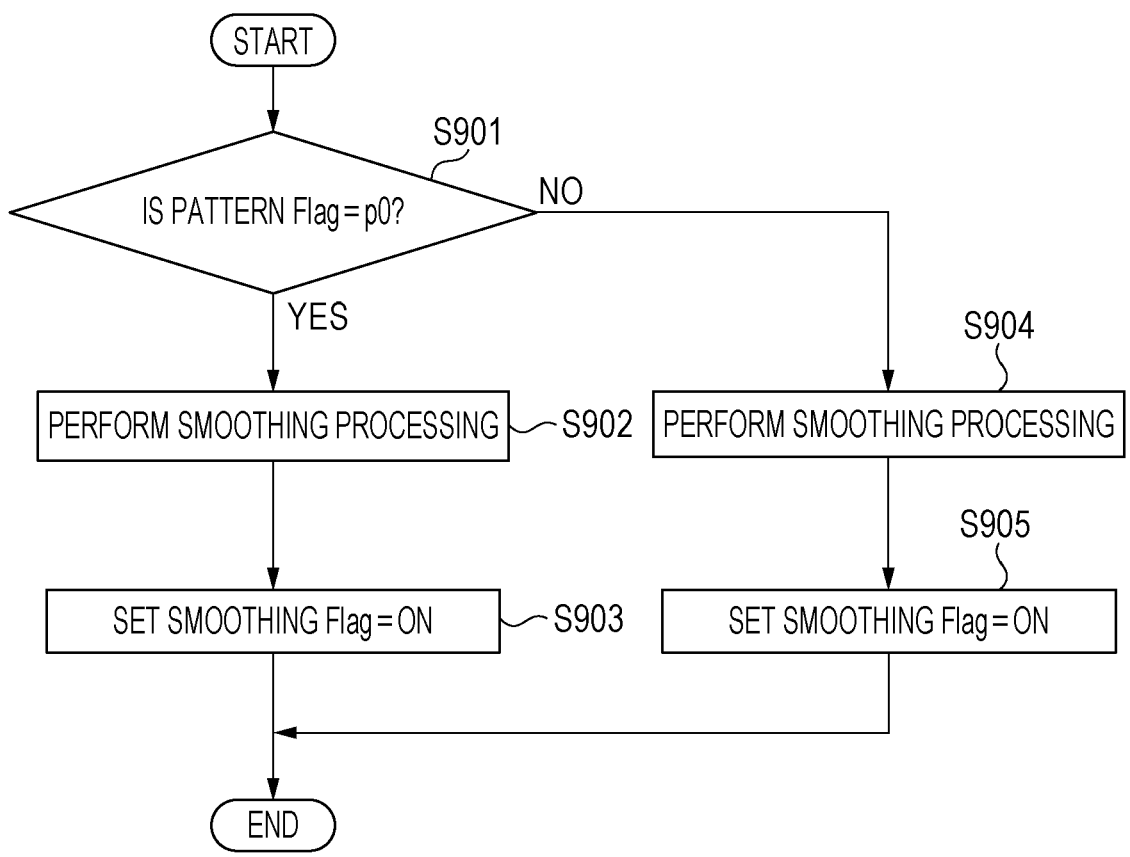
FIG. 9 is a flowchart illustrating an example of smoothing processing when an edge correction determination unit has determined "normal processing".

FIG. 9 is a flowchart illustrating an example of smoothing processing when an edge correction determination unit 605 has determined "normal processing". The CPU 121 reads out the program stored in the ROM 122 to the RAM 123 and executes the program, thereby implementing the processing of the flowchart in FIG. 9. The flow in FIG. 9 is started in response to the completion of the processing of S713.

In S901, the CPU 121 determines whether the pattern Flag is p0. In a case where it is determined that the pattern Flag is p0, the processing proceeds to S902. Otherwise, the processing proceeds to S904.

In S902, the CPU 121 controls the smoothing processing unit 606 so that the smoothing processing unit 606 performs the smoothing processing on the bitmap data 205 and outputs the processed bitmap data 607.

In S903, the CPU 121 controls the smoothing processing unit 606 so that the smoothing processing unit 606 turns on the smoothing Flag 608 for each of pixels on which the smoothing processing has been performed.

In S904, the CPU 121 controls the smoothing processing unit 606 so that the smoothing processing unit 606 performs the smoothing processing on the bitmap data 205 and then outputs the processed bitmap data 607.

In S905, the CPU 121 controls the smoothing processing unit 606 so that the smoothing processing unit 606 turns on the smoothing Flag 608 for each of pixels on which the smoothing processing has been performed.

When normal processing is set, smoothing processing is performed on both the pattern Flag p0 portion and the pattern Flag p1 portion. The pattern of the pattern Flag p0 corresponds to a portion where the image data of the pixel of interest portion is 0, and a data value is added by smoothing processing. The pattern of the pattern Flag p1 corresponds to a portion where the image data of the pixel of interest portion is 1, and a data value is reduced by smoothing processing. In this manner, the smoothing processing is applied to both the addition and reduction of the data value, leading to the processing in which there is no change in the thickness, that is, image data will undergo no thickening or thinning,

[Description of Smoothing Processing]

Figure 21A:
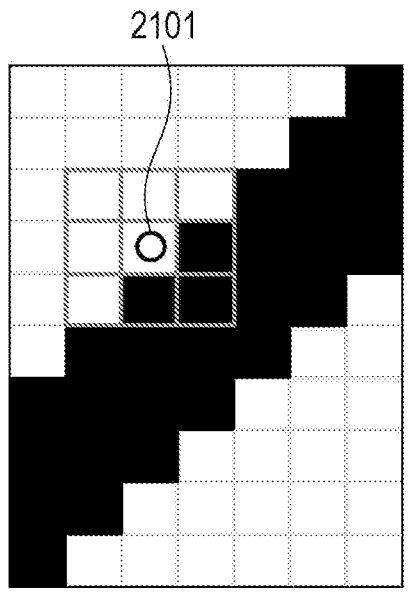
FIGS. 21A to 21D are views illustrating an example of bitmap data during smoothing processing.
Figure 21B:
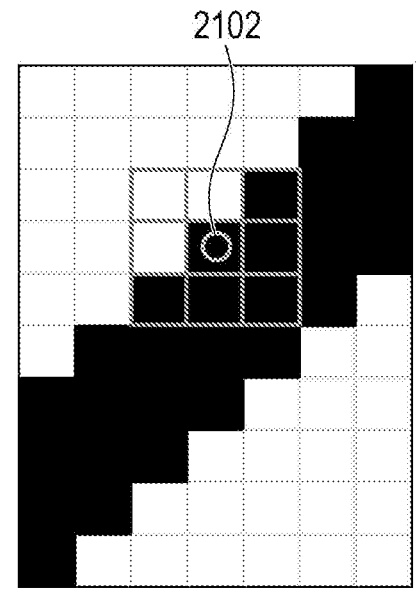

A specific example of the smoothing processing performed by the smoothing processing unit 606 in FIG. 6 will be described with reference to FIGS. 21A to 21D. FIGS. 21A to 21D are views illustrating an example of bitmap data during the smoothing processing, FIG. 21A is a view illustrating bitmap data when the pattern Flag of a pixel of interest 2101 used in the smoothing processing is p0. In contrast, FIG. 21B is a view illustrating bitmap data when the pattern Flag of a pixel of interest 2102 used in the smoothing processing is p1.

Figure 21C:
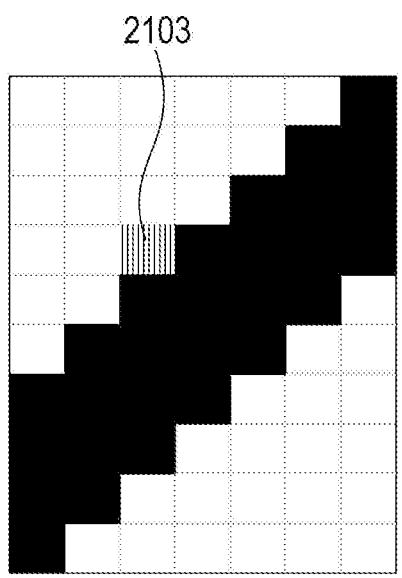

FIG. 21C illustrates bitmap data after the smoothing processing is applied to the pixel of interest 2101 within the bitmap data of FIG. 21A.

Figure 21D:
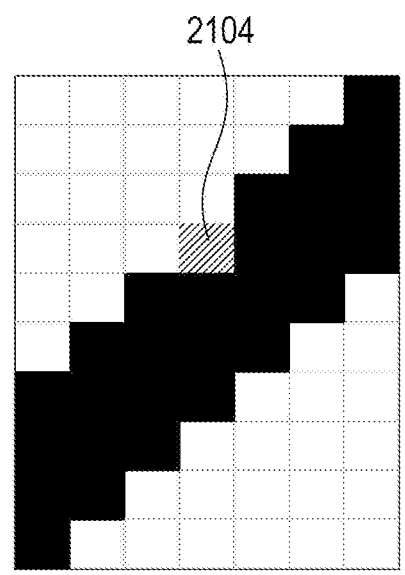

FIG. 21D illustrates bitmap data after the smoothing processing is applied to the pixel of interest 2102 within the bitmap data of FIG. 21B.

First, in FIG. 21A, an average value of nine pixels of 3×3 pixels including the pixel of interest 2101, that is, (0×6+255×3)/9=85 is set as a smoothing value. As a result, the value of the white portion of the pixel of interest 2001 will be changed from "0" indicating "white" to "85". Addition of an intermediate value of white (0) and black (255) reduces the step between black and white, leading to execution of edge correction of the image. Accordingly, the bitmap data will be as a pixel of interest 2103 in FIG. 21C as a result of execution of the smoothing processing.

In contrast, in FIG. 21B, an average value of nine pixels of 3×3 pixels including the pixel of interest 2102, that is, (0×3+255×6)/9=170 is set as a smoothing value. As a result, the value of the black portion of the pixel of interest 2102 will be changed from "255" indicating black to "170". Reduction to an intermediate value of white (0) and black (255) reduces the step between black and white, leading to execution of edge correction of the image. Accordingly, the bitmap data will be as a pixel of interest 2104 in FIG. 21D as a result of execution of the smoothing processing. In the description of the smoothing processing, the average value of the nine pixels including the pixel of interest and the surrounding pixels is obtained. However, the smoothing processing is not limited to this as long as the smoothing processing reduces the step between black and white,

[Example of Thickening Processing by Rendering Conditions (Rules)]

A specific example of a data change flow when the SA function being a rendering condition is turned on and bitmap data having a line attribute as illustrated in FIG. 5B is input to the edge correction processing unit 202 will be described along the flows in FIGS. 7 and 8A.

Figures 16A, 16B, 16C:
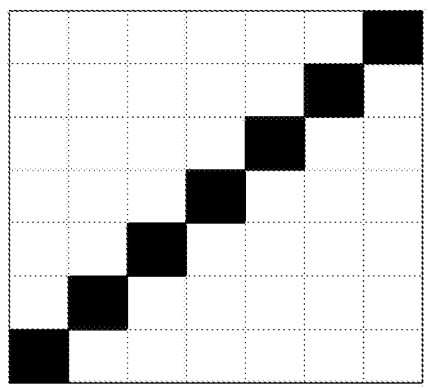
FIGS. 16A to 16C are views illustrating an example of bitmap data and attribute data.

FIGS. 16A to 16C are views illustrating an example of bitmap data and attribute data. FIG. 16A illustrates bitmap data obtained by enlarging a part of the diagonal 45-degree line 506 in FIG. 5B. FIG. 16B illustrates attribute data corresponding to the bitmap data. In FIG. 16B, "B" represents a background attribute, and "L" represents a line attribute.

First, the CPU 121 controls the binarization unit 601 so that the binarization unit 601 performs binarization processing on the bitmap data in FIG. 16A, FIG. 16C is bitmap data obtained by binarizing the bitmap data of FIG. 16A.

Next, the CPU 121 controls the pattern determination unit 602 so that the pattern determination unit 602 performs pattern matching with the patterns of FIG. 16C and FIGS. 10A to 10N. FIGS. 17A to 17C are views illustrating an example of pattern matching between FIG. 16C and FIGS. 10A to 10N.

A pixel 1701 in FIG. 17A matches with the pattern p0 in FIG. 10I, and a pixel 1702 in FIG. 17B matches with the pattern p1 in FIG. 10M. FIG. 17C illustrates a status of the pattern Flag.

Next, the CPU 121 controls the edge correction determination unit 605 so that the edge correction determination unit 605 determines that the pattern Flag portion corresponds to "thickening processing" from Table 1.

Next, the CPU 121 controls the smoothing processing unit 606 so that the smoothing processing unit 606 switches the smoothing processing using the pattern Flag in FIG. 17C with the "thickening processing" setting in Table 2.

FIGS. 18A and 18B are views illustrating an example of determination results from the smoothing processing unit and bitmap data after the smoothing processing. FIG. 18A is a view illustrating a result of determining whether to perform smoothing processing using Table 2 and the pattern Flag in FIG. 17C. A portion to undergo smoothing processing is represented by S, and a portion that is not to undergo smoothing processing is represented by N. FIG. 18B illustrates bitmap data after smoothing processing is applied to FIG. 16A. In comparison between FIG. 16A and FIG. 18B, data has been added to the pattern Flag p0 portion of FIG. 17C, making this portion thicker than the original FIG. 16A.

In contrast, FIG. 19 is a view illustrating attribute data when a black portion in FIG. 16A is not a line but has a graphics attribute. In FIG. 19, "B" represents a background attribute, and "G" represents a graphics attribute. FIGS. 20A and 20B are views illustrating an example of a determination result from the smoothing processing unit and bitmap data after the smoothing processing. FIG. 20A illustrates a result of determining whether to perform smoothing processing with normal processing setting in the case of the graphics attribute, FIG. 20B illustrates bitmap data after the smoothing processing with normal processing setting is applied.

The bitmap data with the line attribute at the SA function ON is thicker than the result of performing the smoothing processing with the normal processing setting, achieving an effect of approaching the state displayed on the monitor in FIG. 5A.

Executing the following processing would allow the image processing apparatus using the StrokeAdjust function of PS to draw a diagonal line with a thickness close to a narrow width designated by a drawing command.

[Example of Thinning Processing by Rendering Condition (Rule)]

A specific example of a data change flow when the bitmap data as illustrated in FIG. 5C of the line attribute is input to the edge correction processing at SA function OFF will be described along the flows in FIGS. 7 and 9.

FIG. 11A illustrates bitmap data obtained by enlarging a part of the diagonal 45-degree line 509 in FIG. 5C. FIG. 11B illustrates attribute data corresponding to the bitmap data. In FIG. 11B, "B" represents a background attribute, and "L" represents a line attribute.

First, the CPU 121 controls the binarization unit 601 so that the binarization unit 601 performs binarization processing on FIG. 11A, FIG. 11C is bitmap data obtained by performing binarization processing on FIG. 11A.

Next, the CPU 121 controls the pattern determination unit 602 so that the pattern determination unit 602 performs pattern matching with the patterns of FIG. 11C and FIGS. 10A to 10N. The pixel 1201 in FIG. 12A matches with the pattern p0 in FIG. 10A, and the pixel 1202 in FIG. 12B matches with the pattern p1 in FIG. 10E. FIG. 12C illustrates a status of the pattern Flag in FIG. 11A.

Next, the CPU 121 controls the edge correction determination unit 605 so that the edge correction determination unit 605 determines that the pattern Flag portion corresponds to "thinning processing" from Table 1.

Next, the CPU 121 controls the smoothing processing unit 606 so that the smoothing processing unit 606 switches the smoothing processing using the pattern Flag in FIG. 12C with the "thinning processing" setting in Table 2.

FIG. 13A is a view illustrating a result of determining whether to perform smoothing processing using Table 2 and the pattern Flag in FIG. 12C. A portion to undergo smoothing processing is represented by S, and a portion that is not to undergo smoothing processing is represented by N.

FIG. 13B illustrates bitmap data after smoothing processing is applied to FIG. 11A. In comparison between FIG. 11A and FIG. 13B, data has been reduced in the pattern Flag p1 portion of FIG. 12C, making this portion thinner than the original FIG. 11A.

In contrast, FIG. 14 is a view illustrating attribute data when a black portion in FIG. 11A is not a line but has a graphics attribute. In FIG. 14, "B" represents a background attribute, and "G" represents a graphics attribute.

Figures 15A, 15B:
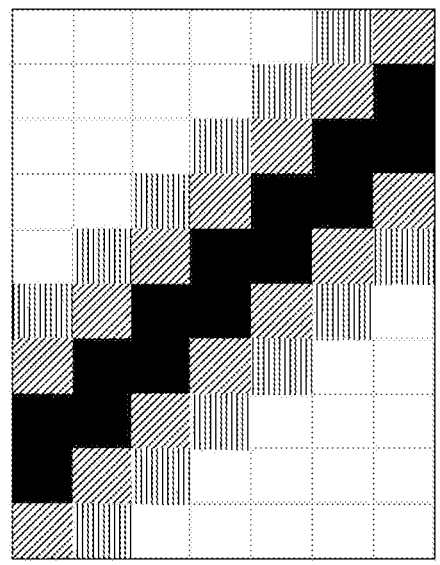
FIGS. 15A and 15B are views illustrating an example of performing normal smoothing processing as usual in a case where the line in FIG. 11A has a graphics attribute.

FIGS. 15A and 15B are views illustrating an example of performing smoothing processing as normal processing as usual in a case where the line in FIG. 11A has a graphics attribute. FIG. 15A illustrates a result of determining whether to perform smoothing processing using Table 2 and the pattern Flag in FIG. 12C in a case where the line of FIG. 11A has a graphics attribute. FIG. 15B illustrates bitmap data after the smoothing processing with normal processing setting is applied.

The bitmap data with the line attribute at the SA function OFF becomes thinner than the result of performing the smoothing processing with the normal processing setting, achieving an effect of approaching the state displayed on the monitor in FIG. 5A.

Executing the following processing allows the image processing apparatus to switch between thickening and thinning the line drawn diagonally with respect to the sheet by the rendering conditions.

Second Exemplary Embodiment

The first exemplary embodiment describes an example of switching the pixel to which the smoothing processing is applied in accordance with the rendering condition. In contrast, the second exemplary embodiment will describe an example of switching the pixel value density conversion processing in the smoothing processing in accordance with the rendering condition, focusing mainly on a difference from the first exemplary embodiment.

Figure 22:
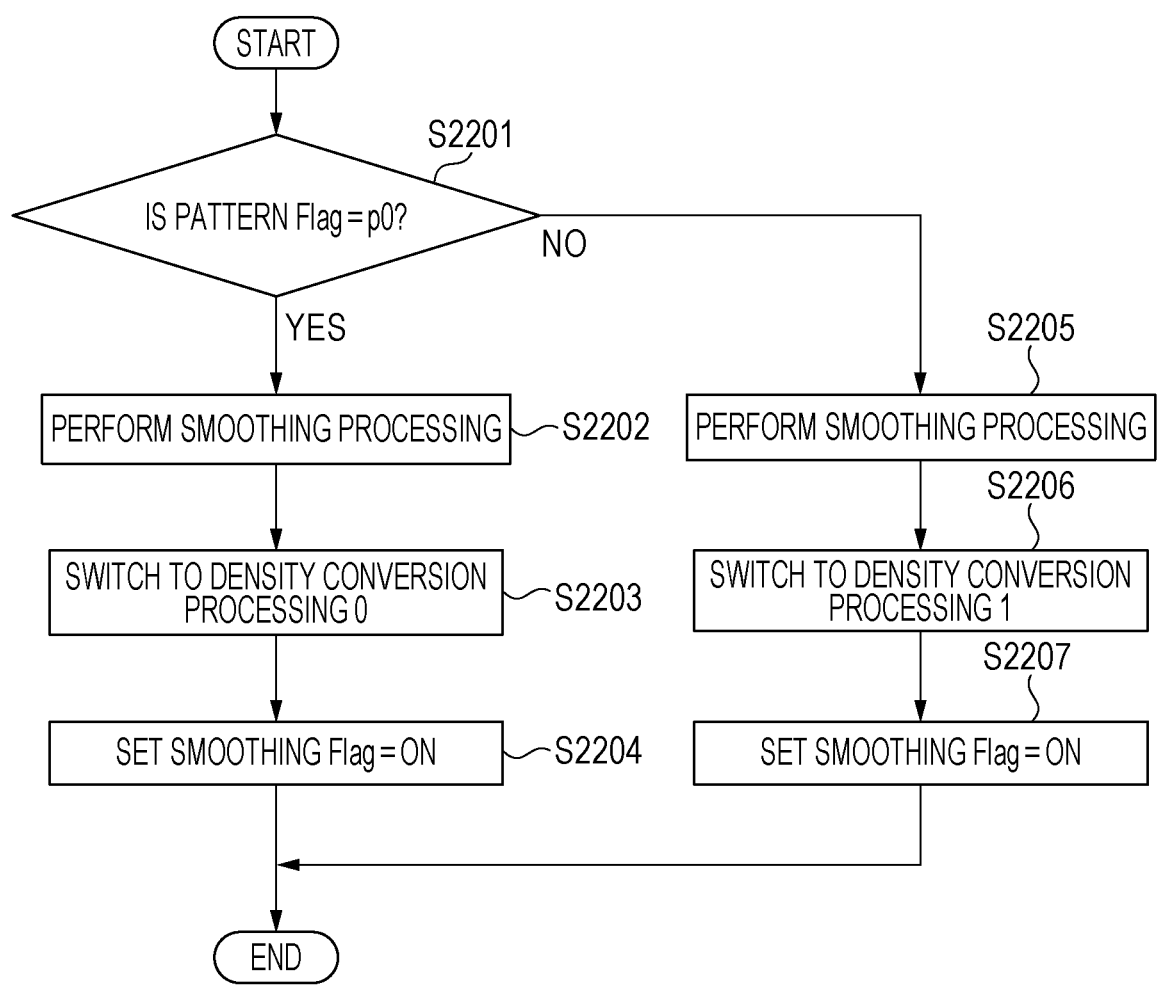
FIG. 22 is a flowchart illustrating an example of processing of switching density conversion processing after smoothing processing on the basis of the determination result obtained by the edge correction determination unit.

FIG. 22 is a flowchart illustrating an example of processing of switching density conversion processing after smoothing processing on the basis of the determination result obtained by the edge correction determination unit 605. The CPU 121 reads out the program stored in the ROM 122 to the RAM 123 and executes the program, thereby implementing the processing of the flowchart in FIG. 22. The flow FIG. 22 is started in response to the completion of the processing of S709, S711, or S713.

First, in S2201, the CPU 121 determines whether the pattern Flag is p0. In a case where it is determined that the pattern Flag is p0, the processing proceeds to S2202. Otherwise, the processing proceeds to S2205.

Next, in S2202, the CPU 121 controls the smoothing processing unit 606 so that the smoothing processing unit 606 performs the smoothing processing on the bitmap data and outputs the processed bitmap data 607.

In S2203, the CPU 121 controls the smoothing processing unit 606 so that the smoothing processing unit 606 switches the conversion table to the density conversion processing 0 under the setting of Table 3 below in accordance with the determination result obtained by the edge correction determination unit 605.

TABLE 3

| | EDGE CORRECTION DETERMINATION | | | | | | |
|---|---|---|---|---|---|---|---|
| | THICKENING PROCESSING | | THINNING PROCESSING | | NORMAL PROCESSING | | NONE |
| PATTERN Flag | p0 | p1 | p0 | p1 | p0 | p1 | — |
| SMOOTHING PROCESSING | Yes | Yes | Yes | Yes | Yes | Yes | No |
| DENSITY CONVERSION PROCESSING 0 | up0 | — | down0 | — | normal0 | — | — |
| DENSITY CONVERSION PROCESSING 1 | — | up1 | — | down1 | — | normal1 | — |

Table 3 illustrates settings of edge correction as the determination result of the edge correction determination unit 605, smoothing processing corresponding to the pattern Flag of the pattern determination unit 602, density conversion processing 0, and density conversion processing 1. The density conversion processing 0 is a density conversion applied after the smoothing processing of a portion where the pixel of interest is 0 in the pattern with the pattern Flag p0. This corresponds to density conversion applied to 2103 in FIG. 21C, for example. For example, in a case where the edge correction determination result is "thickening processing", the setting to increase the density (up0) is made so as to achieve thicker appearance by increasing the density. In contrast, in a case where the edge correction determination result is "thinning processing", the setting to decrease the density (down0) is made so as to achieve thinner appearance by decreasing the density. Moreover, in a case where the edge correction determination result is "normal processing", the setting to not change the density (normal 0) is made so as to keep the thickness unchanged.

In S2204, the CPU 121 turns on the smoothing Flag 608 of the pixel that has undergone the smoothing processing.

In S2205, the CPU 121 controls the smoothing processing unit 606 so that the smoothing processing unit 606 performs the smoothing processing on the bitmap data and outputs the processed bitmap data 607.

In S2206, the CPU 121 controls the smoothing processing unit 606 so that the smoothing processing unit 606 switches the conversion table to the density conversion processing 1 under the setting of Table 3 in accordance with the determination result obtained by the edge correction determination unit 605.

The density conversion processing 1 is a density conversion applied after the smoothing processing of a portion where the pixel of interests 1 in the pattern having the pattern Flag p1. This corresponds to density conversion applied to 2104 in FIG. 21D, for example. In a case where the edge correction determination result is "thickening processing", the setting to increase the density (up1) is made so as to achieve thicker appearance by increasing the density. In contrast, in a case where the edge correction determination result is "thinning processing", the setting to decrease the density (down1) is made so as to achieve thinner appearance by decreasing the density. Moreover, in a case where the edge correction determination result is "normal processing", the setting to not change the density (normal 1) is made so as to keep the thickness unchanged.

In S2207, the smoothing processing unit in FIG. 6 turns on the smoothing Flag 608 for the pixels on which the smoothing processing has been performed, and outputs the data.

Figure 23:
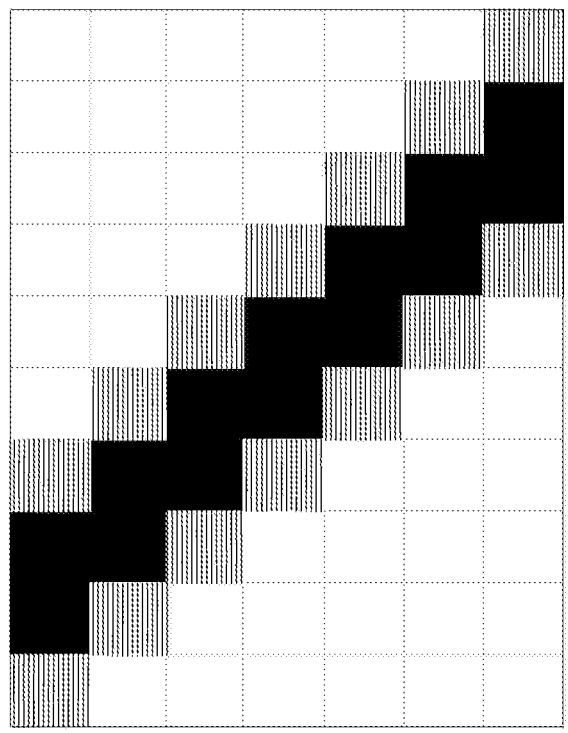
FIG. 23 is a view illustrating bitmap data after density correction processing is performed on bitmap data with line attributes when the SA function is turned off.
Figure 24:
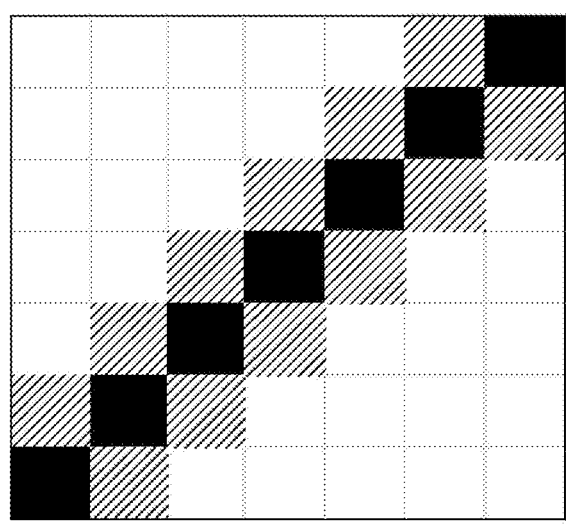

FIG. 23 is a view illustrating bitmap data after density correction processing is performed on bitmap data with line attributes when the SA function is turned off. FIG. 15B illustrates bitmap data obtained by performing smoothing processing on both portions with the pattern Flags p0 and p1. FIG. 23 illustrates a result obtained by thinning with the density conversion processing performed on FIG. 15B. The thinning processing is achieved by making it thinner than the "normal processing" of the smoothing processing setting, FIG. 24 is a view illustrating bitmap data after density correction processing is performed on bitmap data with line attributes when the SA function is turned on. FIG. 20B illustrates bitmap data obtained by performing smoothing processing on both portions with the pattern Flags p0 and p1, FIG. 24 illustrates a result obtained by thickening with the density conversion processing performed on FIG. 20B. The thickening processing is achieved by making it thicker than the "normal processing" of the smoothing processing setting.

In the second exemplary embodiment, the smoothing processing is performed in a case where the pattern Flag is both p0 and p1, regardless of the determination result obtained by the edge correction determination unit 605. Thereafter, the density of the bitmap data after the smoothing processing is adjusted in accordance with the determination result obtained by the edge correction determination unit 605, thereby implementing "thickening processing", "thinning processing", and "Normal processing" similar to those of the first exemplary embodiment.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform c functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-242853, filed Dec. 26, 2018, which is hereby incorporated by reference herein in its entirety.

What is claimed is:

1. An image processing apparatus comprising:
a controller including a processor and a memory, the controller configured to perform operations including:
receiving print data,
executing rendering processing based on the print data to generate bitmap data,
determining whether a rendering setting to be used in the rendering processing to generate bitmap data in which a diagonal line designated by the print data to have a predetermined line width is thinner than the predetermined line width is included, and
executing smoothing processing on the generated bitmap data,
wherein the smoothing processing thickens the diagonal line within the generated bitmap data based on determination that the rendering setting is included in the print data, and the smoothing processing thins the diagonal line within the generated bitmap data based on determination that the rendering setting is not included in the print data.

2. The image processing apparatus according to claim 1, wherein executing smoothing processing includes executing smoothing processing on a first pixel of interest on which a pixel near the first pixel of interest and a predetermined pixel pattern match within the bitmap data.

3. The image processing apparatus according to claim 2, wherein the smoothing processing of thickening the diagonal line executes smoothing processing on a second pixel of interest using a pixel near the second pixel of interest that indicates a line attribute and matches with a second pixel pattern.

4. The image processing apparatus according to claim 2, wherein the smoothing processing of thinning the diagonal line executes smoothing processing on a third pixel of interest using the third pixel of interest that indicates a line attribute, wherein a pixel near the third pixel of interest matches with a third pixel pattern.

5. The image processing apparatus according to claim 1, wherein, the further an angle of the diagonal line with respect to a sheet is from being horizontal or vertical, an intensity of the executed smoothing processing becomes higher.

6. The image processing apparatus according to claim 1, wherein a rendering condition that is used in the rendering processing is set based on a turn on state of a PostScript StrokeAdjust function.

7. The image processing apparatus according to claim 6, wherein the performed operations further include receiving a setting of whether to turn on or off the PostScript StrokeAdjust function.

8. The image processing apparatus according to claim 1, wherein the performed operations further include printing an image on a sheet based on smoothed bitmap data generated by executing smoothing processing on the generated bitmap data.

9. The image processing apparatus according to claim 1, wherein the rendering setting is a stroke adjustment setting.

10. The image processing apparatus according to claim 1, wherein, based on determination that the rendering setting is included in the print data, the rendering processing that thins the diagonal line is executed, and based on determination that the rendering setting is not included in the print data, the rendering processing that thickens the diagonal line is executed.

11. The image processing apparatus according to claim 1, wherein the rendering setting indicates a rule of converting coordinates from coordinates of the print data to coordinates of bitmap data to be generated.

12. A method for an image processing apparatus, the method comprising:
receiving print data;
executing rendering processing based on the print data to generate bitmap data;
determining whether a rendering setting to be used in the rendering processing to generate bitmap data in which a diagonal line designated by the print data to have a predetermined line width is thinner than the predetermined line width is included; and
executing smoothing processing on the generated bitmap data,
wherein the smoothing processing thickens the diagonal line within the generated bitmap data based on determination that the rendering setting is included in the print data, and the smoothing processing thins the diagonal line within the generated bitmap data based on determination that the rendering setting is not included in the print data.

13. The method according to claim 12, wherein the rendering setting is a stroke adjustment setting.

14. The method according to claim 12, wherein, based on determination that the rendering setting is included in the print data, the rendering processing that thins the diagonal line is executed, and based on determination that the rendering setting is not included in the print data, the rendering processing that thickens the diagonal line is executed.

15. The method according to claim 12, wherein the rendering setting indicates a rule of converting coordinates from coordinates of the print data to coordinates of bitmap data to be generated.

16. A non-transitory computer-readable storage medium storing a program to cause a computer to perform a method for an image processing apparatus, the method comprising:
receiving print data;
executing rendering processing based on the print data to generate bitmap data;
determining whether a rendering setting to be used in the rendering processing to generate bitmap data in which a diagonal line designated by the print data to have a predetermined line width is thinner than the predetermined line width is included; and
executing smoothing processing on the generated bitmap data,
wherein the smoothing processing thickens the diagonal line within the generated bitmap data based on determination that the rendering setting is included in the print data, and the smoothing processing thins the diagonal line within the generated bitmap data based on determination that the rendering setting is not included in the print data.

17. The non-transitory computer-readable storage medium according to claim 16, wherein the rendering setting is a stroke adjustment setting.

18. The non-transitory computer-readable storage medium according to claim 16, wherein, based on determination that the rendering setting is included in the print data, the rendering processing that thins the diagonal line is executed, and based on determination that the rendering setting is not included in the print data, the rendering processing that thickens the diagonal line is executed.

19. The non-transitory computer-readable storage medium according to claim 16, wherein the rendering setting indicates a rule of converting coordinates from coordinates of the print data to coordinates of bitmap data to be generated.

* * * * *